United States Patent [19]
Laubach et al.

[11] Patent Number: 6,081,533
[45] Date of Patent: Jun. 27, 2000

[54] METHOD AND APPARATUS FOR AN APPLICATION INTERFACE MODULE IN A SUBSCRIBER TERMINAL UNIT

[75] Inventors: Mark Laubach, Mountain View; Paul Baran, Atherton; Ali Raissinia, Monte Sereno; Kenneth Gorman, Danville; Sanford Helton, San Jose, all of Calif.

[73] Assignee: Com21, Inc., Milpitas, Calif.

[21] Appl. No.: 08/881,942

[22] Filed: Jun. 25, 1997

[51] Int. Cl.[7] .................................................. H04Q 11/04
[52] U.S. Cl. .......................... 370/421; 370/395; 370/466; 370/486; 348/10; 348/12
[58] Field of Search .................................... 370/241, 395, 370/401, 421, 465, 466, 484, 486, 487, 488, 420, 389; 348/6, 10, 12

[56] References Cited

U.S. PATENT DOCUMENTS

| | | | |
|---|---|---|---|
| 4,057,847 | 11/1977 | Lowell et al. | 364/200 |
| 4,343,042 | 8/1982 | Schrock et al. | 455/5 |
| 4,611,320 | 9/1986 | Southard | 370/241 |
| 4,987,468 | 1/1991 | Thornton | 357/34 |
| 5,453,980 | 9/1995 | Van Engleshoven | 370/465 |
| 5,600,643 | 2/1997 | Robrock, II | 370/399 |
| 5,774,665 | 6/1998 | Jeong et al. | 370/395 |
| 5,790,548 | 8/1998 | Sistanizadeh et al. | 370/401 |
| 5,878,047 | 3/1999 | Ganek et al. | 370/486 |

FOREIGN PATENT DOCUMENTS

| | | | |
|---|---|---|---|
| 0 726 675 | 8/1996 | European Pat. Off. | H04N 7/088 |
| WO 94/13107 | 6/1994 | WIPO | H04N 7/16 |
| WO 97/09800 | 3/1997 | WIPO . | |
| WO 97/15009 | 4/1997 | WIPO | G06F 11/22 |
| WO 97/19565 | 5/1997 | WIPO . | |

OTHER PUBLICATIONS

Biedron, W. S. *Metropolitan Area Network Services Comprised of Virtual Local Area Networks Running over Hybrid–Fiber/Coax and Asynchronous Transfer Mode Technologies.* Proceedings of SPIE, vol. 2609, Oct. 23, 1995, pp50–57, XP002049372. .

Gefriedes, A. et al. *Standard Bus Connects Up to 126 Peripherals: Plug and Play with USB.* Components, vol. 31, No. 3, May 1996, pp. 36–38, XP 000623765.

Hurley, T. R. *Evolution of Digital Set Top Box.* International Broadcasting Convention, 1996, pp. 277–282, XP002097006.

Kim, J. H. et al. *ADSL/HDSL Technologies and Applications in VOD and Multimedia Services.* International Broadcasting Convention, No. 413, Jan. 1, 1995, pp. 346–350, XP000564793.

Paskins, A. *The IEEE 1394 Bus.* IEEE Half–Day Colloquium on New High Capacity Digital Media and Their Applications. May 12, 1997, pp. 4/1–4/6. XP002071700.

Quinnell, A. *USB: A Neat Package with a Few Loose Ends.* EDN Electrical Design News, vol. 41, No. 22 Oct. 24, 1996, pp. 38–46, 48, 52, XP000679886.

Williams, t. *STB Operating Systems Gear Up for Flood of Data Services.* Computer Design, vol. 35, No. 2, Feb. 1, 1996, pp. 67–68, 72, 74–76, 78, 80, XP000555483.

*Primary Examiner*—Dang Ton
*Assistant Examiner*—Shick Hom
*Attorney, Agent, or Firm*—Wagner Murabito & Hao LLP

[57] ABSTRACT

A method for enhancing the functionalities of a subscriber terminal unit (STU) or ADSL terminal unit (ATU) through the use of different types of application interface modules (AIMs). This is accomplished by incorporating a slot in the STU/ATU through which a detachable AIM can be inserted and electrically coupled to the STU/ATU. The STU/ATU has circuitry for determining which particular type of AIM has been inserted. Depending on the type of AIM that has been inserted in the STU/ATU (e.g., installation, telephony, diagnostics, network interface, television, etc.), management information specific to the particular AIM is sent by the STU/ATU upstream to the headend unit. In response, the headend unit provides applications service(s) to the STU/ATU, depending on the particular type of device inserted into the subscriber terminal unit.

89 Claims, 19 Drawing Sheets

METHOD AND APPARATUS FOR AN APPLICATION INTERFACE MODULE IN A SUBSCRIBER TERMINAL UNIT

FIELD OF THE INVENTION

The present invention relates to an apparatus and method for implementing an application interface module for use in conjunction with a subscriber terminal unit or ADSL modem.

BACKGROUND OF THE INVENTION

Due to the proliferation of personal computers, the widespread acceptance of the Internet, and the advent of the Information Age, there is a virtual explosion in the amount of digital data transmissions. Currently, one common method for transmitting and receiving digital data involves the use of telephone modems. A telephone modem is used to transmit digital data generated by a computer to an intended destination over standard telephone lines. The same modem also can receive digital data from a telephone line. This setup enables computers to gain access to the Internet and other on-line services over standard telephone jacks. Although this form of communications is convenient, it is painfully slow because telephone lines simply consist of pairs of twisted copper wires. These lines were primarily designed to carry analog voice signals rather than digital data. As such, telephone lines are bandwidth limited, and the rate at which digital data can be transmitted is relatively quite slow. It can take several minutes or even hours to download picture, audio, and video files via standard telephone modems. Hence, telephone modems are not ideally suited for conveying video (e.g., teleconferencing, movies, etc.), graphics (e.g., computer-aided design, medical imaging, simulations), or multimedia applications.

A faster medium for high-speed communications entails the use of dedicated computer networks, whereby computers are interconnected to form local area networks or wide area networks (LAN/WAN). However, the downside to this approach is the high cost of purchasing, routing, and maintaining the requisite interconnecting coaxial and hybrid fiber lines. Furthermore, highly skilled network administrators are necessary to monitor the network in order to keep it operational. In addition, expensive networking equipment (e.g., routers, hubs, repeaters, concentrators, servers, bridges, etc.) must be purchased and installed. Hence, the advantage of having faster data communications and higher bandwidth comes at a steep price. Furthermore, it is prohibitively expensive to set up dedicated computer networks amongst individual homes.

There is, however, another medium which is already in place and is widespread and which also has a very high bandwidth suitable for transmitting vast amounts of information. This medium is the cable TV (CATV) systems. CATV is comprised of coaxial and fiber optic cables which have very high transmission capacity. In the past, CATV was primarily limited to being a one-way only transmission medium, whereby TV signals were distributed from a central "head-end" terminal, over the CATV network, to a number of subscribers' television sets. But instead of simply broadcasting TV signals, it is feasible to use these CATV networks to provide high capacity two-way data communications. By implementing subscriber terminal units (STUs) or cable modems, computers can transmit and receive data packets at high data rates over existing fiber coax CATV systems. In fact, developers have been working on such systems for delivering various digital data over standard CATV systems.

Presently, STU and cable modem designs follow the same configuration as telephone modems did in the past, in that they are typically stand-alone, self-contained units. As such, STUs suffer from several deficiencies. First, it can take a relatively long time to install an STU because the STU initially has to find and acquire a channel for its transmissions. Installing a single STU can take upwards of half an hour. Consequently, upgrading an existing cable system or installing a new cable system with thousands or even millions of these STUs can be a very costly and time-consuming task. Another deficiency with having a self-contained unit is that it is extremely difficult for a single STU design to accommodate all the different standards and formats existing today. It is even more difficult to predict, anticipate, and support future standards and formats (e.g., "firewire" IEEE 1394, Universal Serial Bus, etc.). Another deficiency with self-contained designs relates to diagnostics. Some prior art STUs incorporate built-in self test circuitry within each and every unit for purposes of performing diagnostics. However, it is costly to implement this added circuitry with every unit. Other prior art designs do not include any testing circuitry within the unit. This approach requires that a malfunctioning unit be shipped back to the manufacturer, which then disassembles the unit and hooks it up to specialized test equipment in order for diagnostics to be performed. Although the cost of each unit is minimized, performing troubleshooting and diagnostics is very inconvenient and inefficient. Yet another deficiency with implementing a self-contained unit pertains to flexibility and functionality. Some subscribers may wish to use the STU solely for exchanging digital data (e.g., Internet and Web browsing, email, etc.), whereas other subscribers may desire other types of services (e.g., video on demand, home shopping, telephony, interactive gaming, etc.). Shipping STUs with the full range of functionalities is prohibitively expensive, especially if a large number of subscribers is not even interested in subscribing to and paying for these enhanced services. On the other hand, it would be attractive if a cable operator could offer these services as options and capture the revenues of interested subscribers.

In addition, present Asymmetric Digital Subscriber Line (ADSL) modems also suffer from many of the same problems as discussed above. Namely, it is difficult for diagnostics to be performed in the field for an ADSL modem. Furthermore, it is difficult or even impossible to enhance the functions or upgrade the services of current ADSL modems.

In recognition of these deficiencies, the present invention offers a solution by implementing an application interface module (AIM). Basically, the STU of the present invention contains a slot into which any one of several different AIM modules can be inserted. These AIM modules have specific circuitry for facilitating and enabling a wide variety of functions. The AIM module of the present invention can also be adapted to work with ADSL technology.

SUMMARY OF THE INVENTION

The present invention pertains to an apparatus and method for implementing an application interface module for use in conjunction with a subscriber terminal unit. The STU contains one or more slots through which an application interface module can be inserted and electrically coupled thereto. The same slot can be used to accept one of several different AIM modules. Different application interface modules contain specific circuitry and/or software for effecting a number of different functions. In one embodiment, an "installation" application interface module derives and stores information gained from past experience during the installation of a previous STU. This information can then be exploited to reduce the installation time for successive STUs. In a second embodiment, a "network" application interface module can be inserted to provide the STU with enhanced network interfaces (e.g., IEEE 1394, USB, etc.). In a third embodiment, the present invention includes a "diagnostic" application interface module which is inserted into the STU by a cable technician and used for performing diagnostics on that STU. In another embodiment, an "enhanced services" application interface module can be used to provide enhanced services, such as telephony, video, etc. In another embodiment, the application interface module is used to support and/or provide enhanced services to an ADSL terminal unit.

BRIEF DESCRIPTION OF THE DRAWINGS

The operation of this invention can be best visualized by reference to the drawings.

DETAILED DESCRIPTION

An apparatus and method for implementing an application interface module for use in conjunction with a subscriber terminal unit is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. A more detailed description of the CATV system is described in the patent application, Ser. No. 08/864,550, entitled, "MULTI-CHANNEL SUPPORT FOR VIRTUAL PRIVATE NETWORKS IN A PACKET TO ATM CELL CABLE SYSTEM," filed on May 27, 1997 and which is incorporated by reference in its entirety herein.

Figure 1:
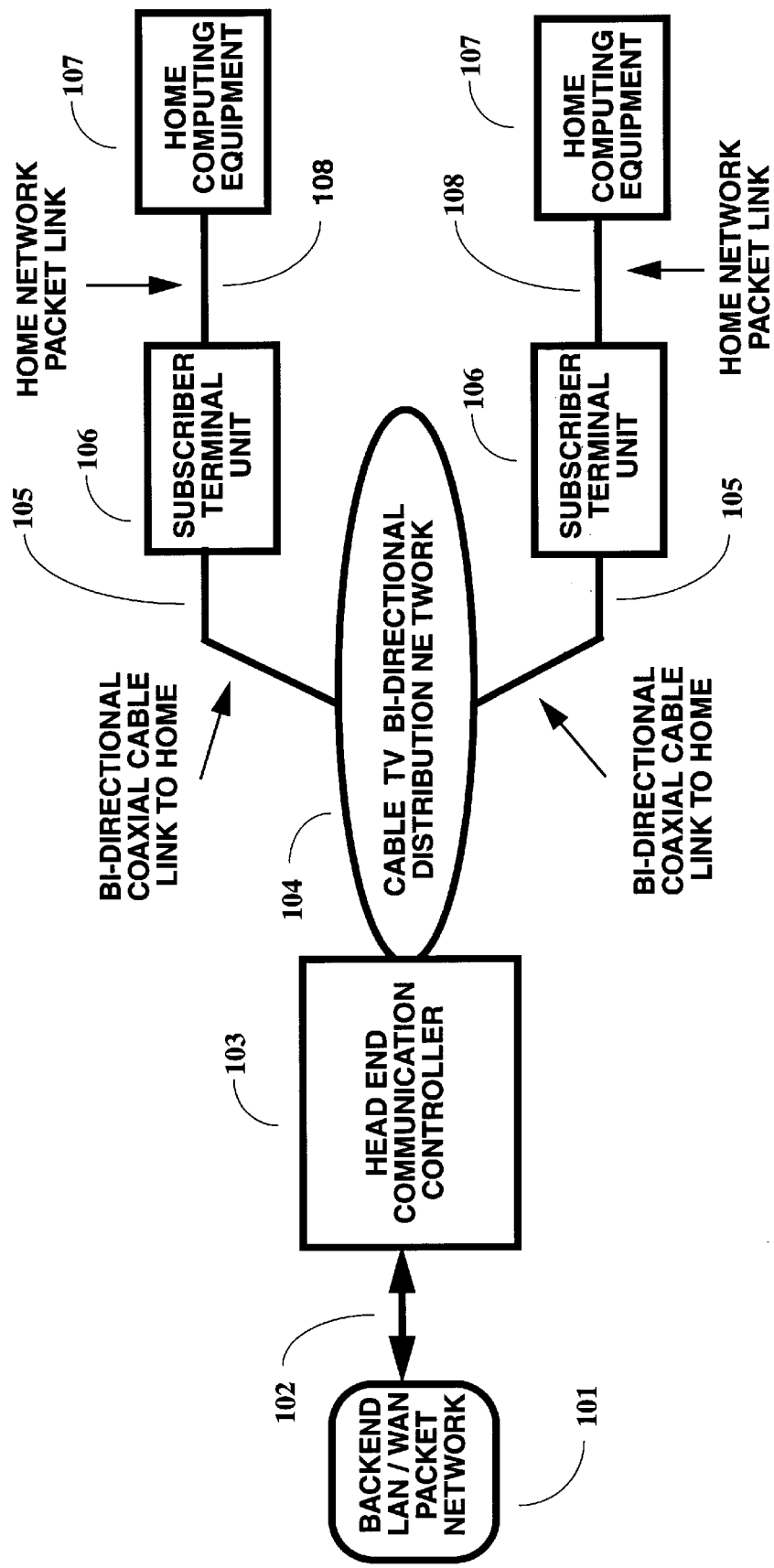
FIG. 1 shows a head-end communication controller coupled to subscriber terminal units in a cable television network.

Referring to FIG. 1, a head-end communication controller 103 coupled to the subscriber terminal units 106 in a cable television network 104 is shown. A backend LAN/WAN packet network 101 transmits and receives packet data to/from the headend controller 103 over a network interface 102. These packet data correspond to exclusive or combination of Ethernet, ATM (including SONET, D353, or T1), FDDI, or voice (TR303, TR57, or TR08) protocols. The headend controller 103 facilitates communications, both upstream and downstream, and is responsible for all bandwidth management and all resource management, including modulation, frequency, bandwidth, and power assignment. The headend controller prioritizes upstream ATM cells. Moreover, it also converts packet data into ATM cells and assigns virtual connection to each individual ATM cell. This virtual connection information allows individual cells to be prioritized for transmission. In addition, the virtual connection information is used to identify one or more subscriber terminal units (STUs) which are to receive the particular cell. More specifically, the virtual connection information identifies particular circuits within designated STUs to which an individual ATM cell is to be routed. The ATM cells are then sent as one or more RF signals over the bi-directional CATV distribution network 104. The CATV distribution network 104 consists of standard coaxial cable, hybrid fiber-coax (HFC) cable, or fiber optic cables. Cables 105 provide physical links to multiple subscriber terminal units, such as STUs 106. Local packet links 108 are used to establish communications between the STUs 106 and personal computers 107.

In summary, packet data originating from backend LAN/WAN network 101 are sent to the headend controller 103 and converted into ATM cells. These ATM cells are prioritized and routed according to their respective virtual connections and sent downstream as RF signal(s) over the CATV network 104. The target STU(s) 106 demodulate the RF signal(s), convert the ATM cells into data packets, and forwards the packet data to PCs 107. Conversely, a number of PCs 107 may forward packet data to their respective STUs 106. The packet data are converted into ATM cells and transmitted upstream in a slotted burst mode over the CATV network 104 to the headend controller 103. The ATM cells are then converted back into packet data which are sent on to the LAN/WAN network 101.

Figure 2:
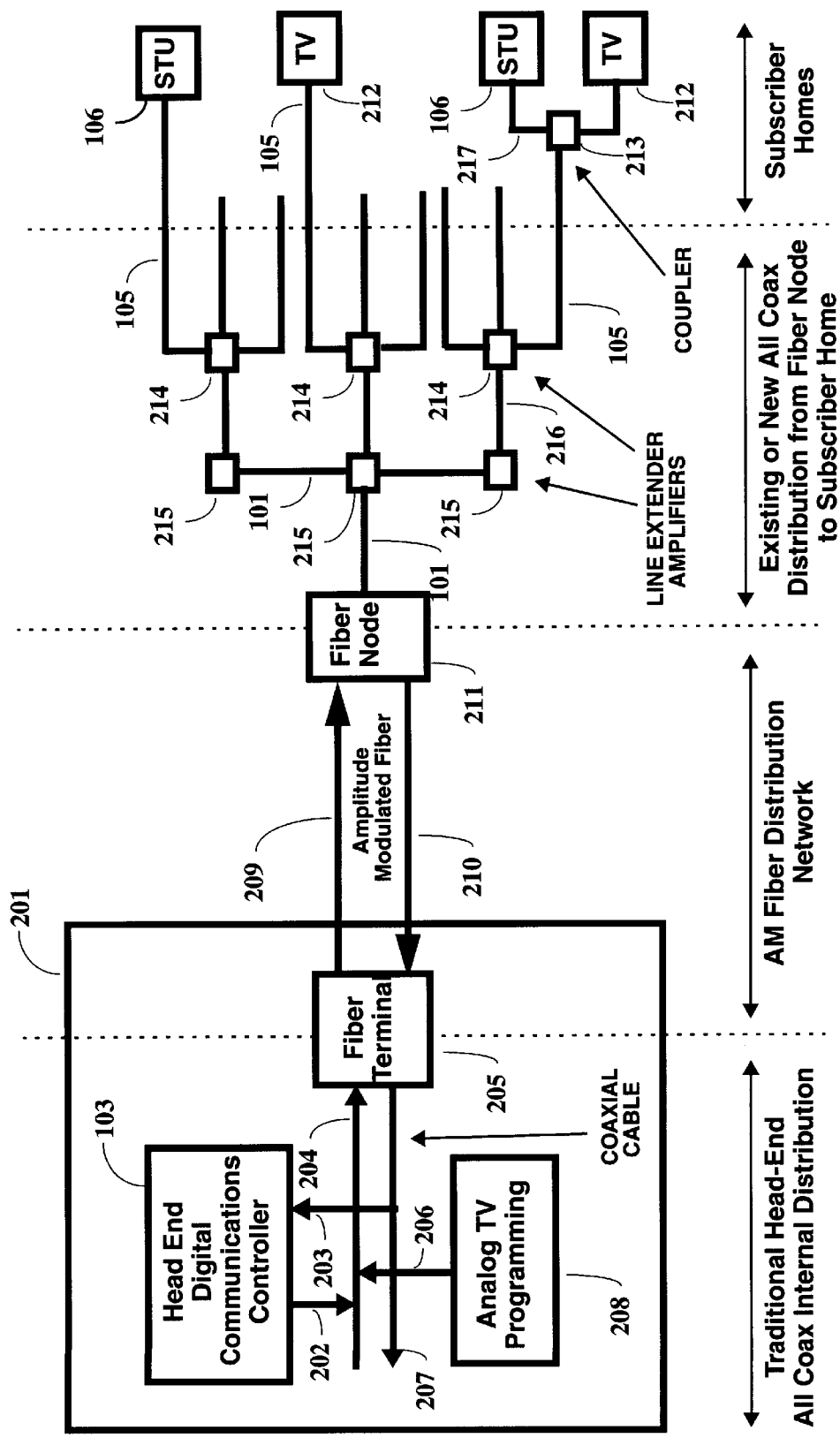
FIG. 2 illustrates a Hybrid Fiber-Coax Cable TV distribution network with a headend network and the placement of the head-end communications controller and subscriber terminal units.

FIG. 2 illustrates a Hybrid Fiber-Coax Cable TV distribution network with a headend network 201 and the placement of the head-end communications controller 103 and subscriber terminal units 106. The headend network 201 consists of a headend digital communications controller 103 for controlling all digital data traffic, both to the fiber terminal 205 via coaxial links 202 and 204 and from the fiber terminal 205 via coaxial links 203 and 207. Traditional analog TV programming by block 208 can be supported as well by transmitting the RF television signals over lines 206 and 204 to the fiber terminal 205. Fiber terminal 205 is used as an interface to the fiber node 211. Amplitude modulated fiber cables 209–210 provide the connections between the fiber terminal 205 and fiber node 211. A plurality of junctions 213–215 splitting off from fiber node 211 form a coaxial distribution network for routing signals to/from a number of STUs 106 and television sets and set-top boxes 212. For example, STUs is connected to fiber node 211 via line 105, line extender/amplifier 214, line 216, line extender/amplifier 215, and line 101. Likewise, a television set or set-top box 212 is connected to the fiber node 211 via coupler 213, line 105, line extender/amplifier 214, line 216, line extender/amplifier 215, and line 101. The delineation between the various stages of a traditional headend all coax internal distribution, analog fiber distribution network, existing or new all coax distribution, and subscriber homes/offices is shown.

Figure 3:
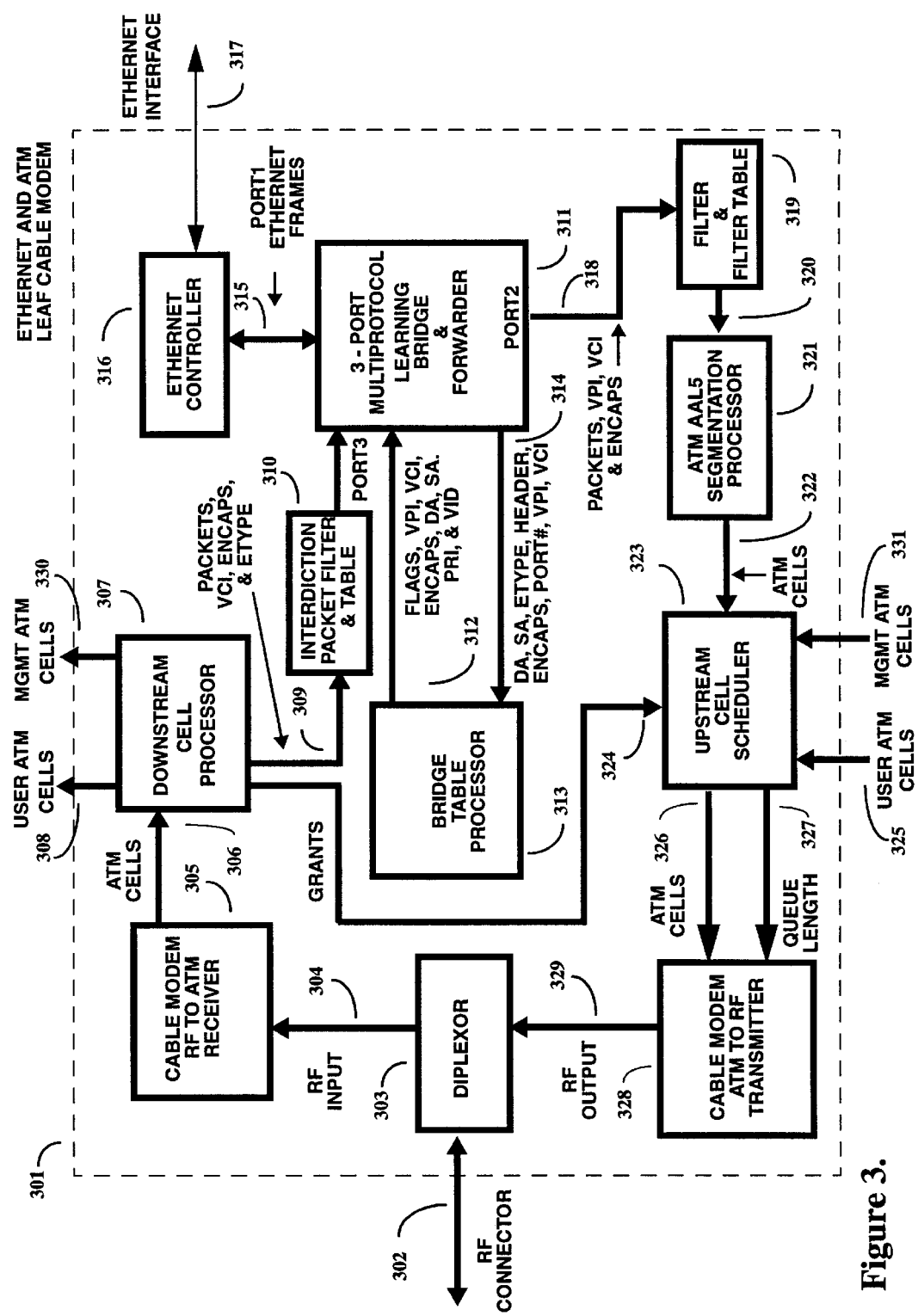
FIG. 3 shows a block diagram of an Ethernet and ATM Leaf Cable Modem.

FIG. 3 shows a block diagram of an Ethernet and ATM Leaf Cable Modem 301. RF signals are received from line 302 by the diplexor 303, which is a common high pass/low pass type filter coupler that routes the downstream RF input 304 to Cable Modem RF to ATM Receiver 305 while routing the RF output 329 from the Cable Modem ATM to RF Transmitter 328 upstream. The decrypted ATM cells from Receiver 305 are then sent on for further processing on line 306 to the Downstream Cell Processor 307. In general, ATM cells containing user data are passed though on line 308, and ATM cells containing management data are output on line 330. The packet, the virtual connection obtained from the ATM cells which carried the data, the encapsulation type, and ETYPE information are transmitted via line 309 to the Interdiction Packet Filter & Table 310. The Interdiction Filter 310 maintains an internal table of permit and deny filter entries that are maintained by the cable operator, no customer access is allowed to this table. The purpose of the filter is to restrict packet flow to the subscriber to only permit packets that have been assigned for reception. In unicast networking forwarding, this restriction function is typically met by limiting which packets are sent downstream to the STU. However, with this filter and the nature of multicast and broadcast traffic, the cable operator may be available to a customer on a fee basis. By specially enabling the STU to receive a multicast group, allows one copy of the information to be sent on the downstream channel, that is the downstream data bandwidth resources, and that only the STUs that have been enabled to receive the group are allowed access.

Upon receiving an Ethernet Frame from Port 3, the Leaf Forwarder 311 constructs a query 314 comprised of information obtained from the Ethernet Frame, specifically the Destination Address ("DA"), the Source Address ("SA"), and the Ethernet Type field ("ETYPE"), additionally the port number that the Ethernet frame was received on, the first 64 octets of the Ethernet frame data or the entire data if less than 64 octets, and the encapsulation type. The query 314 is received by the Bridge Table Processor 313 which performs a table lookup function based upon the information in the query. The Bridge Table Processor 313 returns a response 312 to the Leaf Forwarder comprised of a Forward True/False flag, a Received-SA-Is-Known-SA True/False flag, the VPI and VCI values for the ATM virtual connection, the ATM encapsulation type, the SA and DA values, a priority indicator, and the Virtual LAN identification.

If the DA of the received Ethernet frame was received from Port 3, and indicated a unicast address of an Ethernet device connected to the Ethernet Interface 805 on Port 1, the Ethernet frame is transferred to the Ethernet Controller 316 for transmission on the Ethernet Interface 317. If the DA of the received Ethernet frame was received from Port 3, and indicated a multicast or broadcast address and the Received-SA-Is-Known-SA flag is False, the Ethernet frame is transferred to the Ethernet Controller 316 for transmission on the Ethernet Interface 317. If the Received-SA-Is-Known-SA flag is True, the frame is discarded. In addition to a common learning bridge function constructed similar to that specified in the IEEE 802.1D standard, the Bridge Table Processor 313 sets the Received-SA-Is-Known-SA flag when a query is made in which the SA appears in the bridge table as a SA learned from Port 1. This mechanism prevents the retransmission of multicast and broadcast Ethernet Frames onto Ethernet Interface 317 that have originated from Ethernet Interface 317.

Upon receiving a packet which is not an Ethernet Frame from Port 3, the Leaf Forwarder 311 constructs a query 314 comprised of information obtained from received information 309, specifically the encapsulation type, the ETYPE, additionally the port number that the packet was received on, and the first 64 octets of the packets data or the entire data if less than 64 octets. The query 314 is received by the Bridge Table Processor 313 which performs a table lookup function based upon the information in the query. The Bridge Table Processor 313 returns a response 312 to the Leaf Forwarder 311 comprised of the Forward flag, SA, DA, and the encapsulation type. If the Forward flag is false, the packet is discarded. If the Forward flag is True and if the port number received in the response 312 is Port 1 1015, the packet and the ETYPE received from Port 3 and SA, and DA information returned in the response 312 is used to construct an Ethernet Frame which is then transferred to the Ethernet Controller 316 for transmission on the Ethernet Interface 317. If the port number received in the response 312 is value 2 or value 0, the packet is discarded. There are no transfers of packets or Ethernet frames from Port 3 to Port 2 for Leaf Forwarders 311.

Ethernet frames are received over a commonly available Ethernet Interface 317, where they are received by a commonly available Ethernet Controller 316. Ethernet frames are then transferred 315 to the Leaf Forwarder 311. Upon receiving a Ethernet Frame from Port 1 1015, the Leaf Forwarder 311 constructs a query 314 comprised of information obtained from the Ethernet Frame, specifically the DA, SA, and ETYPE, additionally the port number that the Ethernet frame was received on, the first 64 octets of the Ethernet frame data, and the encapsulation type set to "null". This query 314 is received by the Bridge Table Processor 313 which performs a table lookup function based upon the information in the query. The Bridge Table Processor 313 returns a response 312 to the Leaf Forwarder comprised of the Forwarding flag, the VPI and VCI values for the ATM virtual connection, and the ATM encapsulation type. If the EtherType value of the Ethernet frame received from the Ethernet Controller 316 on Port 1, indicated a specific type or set of types, the virtual connection is identified as VC1,11 822 and the Port number set to 2. Otherwise, the virtual connection is identified as VC1,10 813, and the Port number set to 2. This mechanism demonstrates that received Ethernet frames of differing Ethernet types may be transmitted upstream to the controller using different virtual connections.

The Bridge Table Processor 313 follows the learning bridge forwarding semantics commonly found in the IEEE 802.1D standard. The encapsulation type response is "null" for Ethernet Frames, or "RFC1483-null" if the Ethernet frame contained an Internet Protocol ("IP") datagram and the Internet Engineering Task Force (IETF) RFC1483 standard for null encapsulation was selected, or "RFC1483-LLCSNAP" if the Ethernet frame contained protocol packet of ETYPE and the IETF RFC1483 standard for LLC/SNAP encapsulation was selected. For Ethernet frames received from Port 1, if the response Forward flag is True in 312, the Ethernet frame, the virtual connection information, and the encapsulation type is communicated to the Filter And Filter Table 319 on line 318. Otherwise, if the Forward flag value is False, the Ethernet frame is discarded.

Filter And Filter Table 319 provides a multi-protocol packet examination function which decides whether a packet is allowed to continue upstream or whether it should be discarded. More specifically, address and resolution protocol packets are examined to determine whether the contents of an Address Resolution Protocol (ARP) request or ARP reply match that stored in the Filter Table. The ARP packet is used to translate a hardware address into an IP address. The Filter Table is configure by the cable operator to allow only authorized transmissions upstream. Hence, if Filter 319 determines that the packet is valid, the packet is allowed to proceed upstream to the ATM AAL5 Segmentation Processor 321 on line 320. Otherwise, if there is no match, the packet is discarded. Thereby, cable operators have the ability to control transmissions from the STUs, and unauthorized transmissions can be prevented. It should be noted that this filter function can be implemented in the Ethernet Root Controller. It should be noted that other packets types, such as but not limited to IP packets, can be examined by this filter function.

The ATM AAL5 Segmentation Processor 321 is responsible for receiving Ethernet frames, virtual connection, and encapsulation information 318 from the Leaf Forwarder 311 and converting the Ethernet data into a stream of ATM cells consistent with the commonly available ATM Adaptation Layer 5 ("AAL5") segmentation semantics. The Ethernet data is processed according to the encapsulation information. The virtual connection information is copied to the VPI and VCI values contained in the ATM cells generated by the process. The ATM cells are then transmitted 322 to the Upstream Cell Scheduler 323 which has three inputs associated with enabling the STU to perform upstream transmissions. First, special virtual connections on line 324 are used specifically for grants (e.g., direct, contention, and null). Grant cells designated for this particular STU are identified by their VPIs. ATM cells containing user data are input on line 325, and ATM cells containing management data are input on line 331. Upstream cell scheduler 323 outputs ATM cells on line 326 to the cable modem ATM to RF transmitter 328. Furthermore, a queue length is also input to transmitter 328 on line 327. It should be noted that one embodiment of the present invention switches virtual connections, depending upon the different application or management needs.

Figure 4:
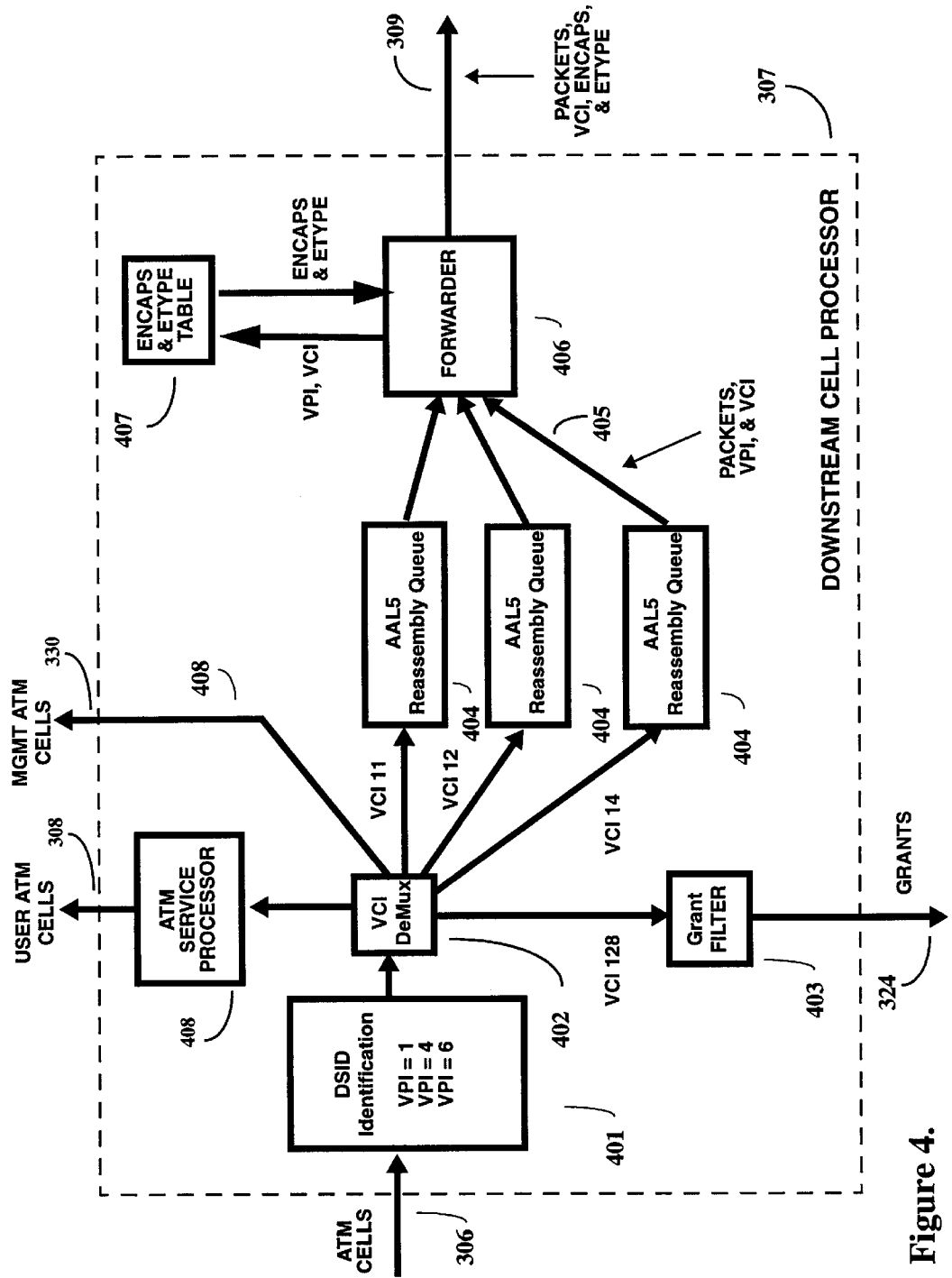
FIG. 4 is a circuit diagram showing the functions and interactions corresponding to a VPI selector and a VC demultiplexer of an STU for handling incoming ATM cells.

FIG. 4 is a circuit diagram showing the functions and interactions corresponding to a VPI selector and a VC demultiplexer of an STU for handling incoming ATM cells on line 306. This combination of circuits is called the Downstream Cell Processor 307. The ATM cell stream output from the cell delineation, HEC verification, and DES decoding blocks is input to the Destination Station ID (DSID) Identification circuit 401. The function of the DSID circuit 401 is to determine which of the ATM cells are to be accepted and which are to be discarded. The STU has been preprogrammed to identify certain VPI values. In the preferred embodiment, one of these VPI values corresponds to the Station Unique Identifier (SUID). The selection process is determined according to the VPIs contained in each individual ATM cell as compared against the preprogrammed VPI values. Only those ATM cells with a VPI value matching the preprogrammed VPI values are retained. Other ATM cells are ignored. In this example, only those cells having VPIs of 1, 4, and 6 are retained for processing. VPI 1 may correspond to a unicast mode, whereby only this particular STU receives ATM cells with a VPI 1 value (i.e., the SUID value). The VPI 1 value is unique to this particular STU. A VPI 6 may correspond to a broadcast mode, whereby it is intended that all STUs are to receive the ATM cell. One or more VPIs can be programmed into the STU so that it accepts multicast ATM cells. For example, VPI 4 may correspond to multicast ATM cells, whereby this particular STU belongs to a specific group of STUs which have been programmed to accept ATM cells with a VPI value of 4. In the preferred embodiment, the DSID Identification function 401 selects ATM cells based on VPI values. It should be noted that this function can be augmented to select ATM cells for further processing based upon any bit pattern contained in the downstream MAC messages. That is, combinations of VPI or VCI may be used or combinations of other MAC header information and VPI or VCI values may be used.

If the DSID identification circuit 401 determines a match between the preprogrammed VPI values and the VPI field of the ATM cell, that particular ATM cell is routed for further processing by the VCI Demultiplexer 402. The VCI Demultiplexer 402 routes the ATM cell to one of several different circuits within the STU, depending on its VCI value. One such VCI value (e.g., VCI 128) causes the ATM cell to the Grant Filter 403. Grant Filter 403 filters the direct, contention, and null grants sent by the headend controller. The grants are then sent on for further processing via line 324. Certain VCI values (e.g., VCI 10–14) cause the ATM cell to be sent to one of several Ethernet AAL5 reassembly queues 404 which reassembles Ethernet frames which have been null encapsulated in an AAL5 stream into Ethernet packets. The reassembled Ethernet packets are sent via lines 405 to the Forwarder 1706. Based on the VPI, VCI values, the Encapsulation and Etype table 407 provides the appropriate encapsulation and etype information to the Forwarder 406. The resulting packets, VCI, encapsulation, and etype information is then output on line 309. Packets which do not get sent to either the Grant Filter 403 or AAL5 Reassembly Queues 404, are input to the ATM Service Processor 408 which determines whether the packet is to be discarded or output onto interface line 308 as user ATM cells. In the currently preferred embodiment, the combination of the DSID 401 and the VCI deMux 402 allows ATM cells to be routed as appropriate. The VCI DeMux block 402 also outputs a data path 408 which conveys ATM cells containing management data to downstream management circuits. For management purposes, the management ATM cell stream on path 408 is sent to the various STUs according to separate VCIs, VPIs, or a combination thereof. Alternative multiplexing schemes may also be used to accomplish this function.

Figure 5:
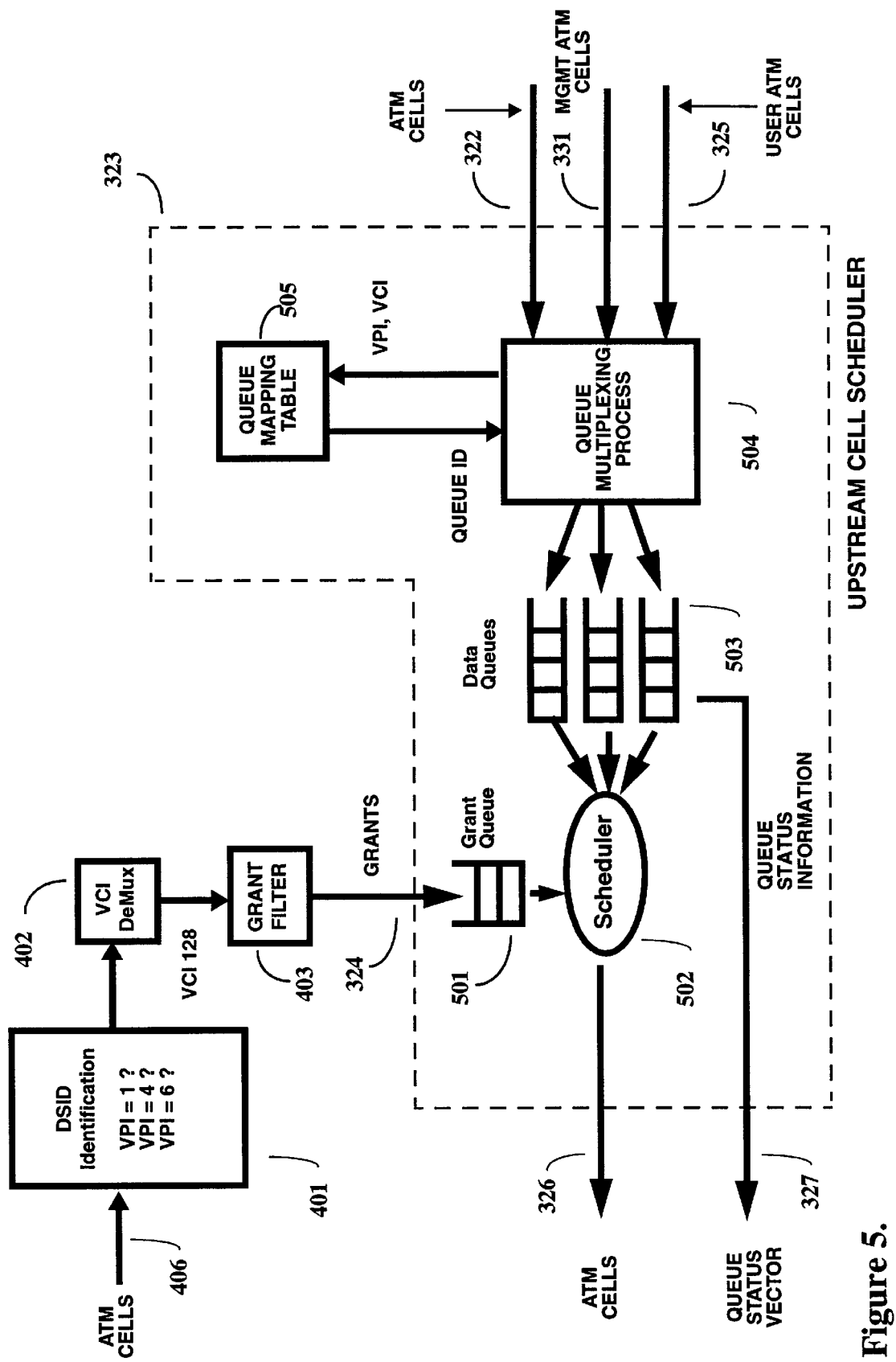
FIG. 5 shows a circuit diagram of an upstream cell scheduler corresponding to an STU.

FIG. 5 shows a circuit diagram of an upstream cell scheduler 323 corresponding to an STU. There are two inputs associated with enabling the STU to perform upstream transmissions. First, special virtual connections on line 324 are used specifically for grants (e.g., direct, contention, and null). Grant cells designated for this particular STU are identified by their VPIs by the DSID identification circuit 401. The VCI demultiplexer 402 routes the grant cells to the grant filter 403 according to the VCI value (e.g., VCI 128) and then to the grant queue 501 via line 324. The queued grants are dispensed to the scheduler 502 which schedules ATM cells for upstream bound transmissions over line 326 according to a slotted transmission process. The actual data to be transmitted is input on lines 322, 331, and 325 to the queue multiplexing process 504. Line 322 inputs ATM cells containing packet data; line 331 inputs ATM cells containing management data, and line 325 inputs ATM cells containing user data. By referencing the VPI, VCI values into a queue mapping table 505, a queue ID is determined. The queue ID allows the queue multiplexing process to prioritize the ATM cells on lines 322, 332, and 325 on an individual basis into the various cell queues 503. Eventually, the ATM cells stored in the cell queues 503 are cleared for transmission by scheduler 502. Furthermore, the aggregate queue length of the ATM cells awaiting transmission in the data queues 503 are sent to the headend controller via line 327.

Figure 6:
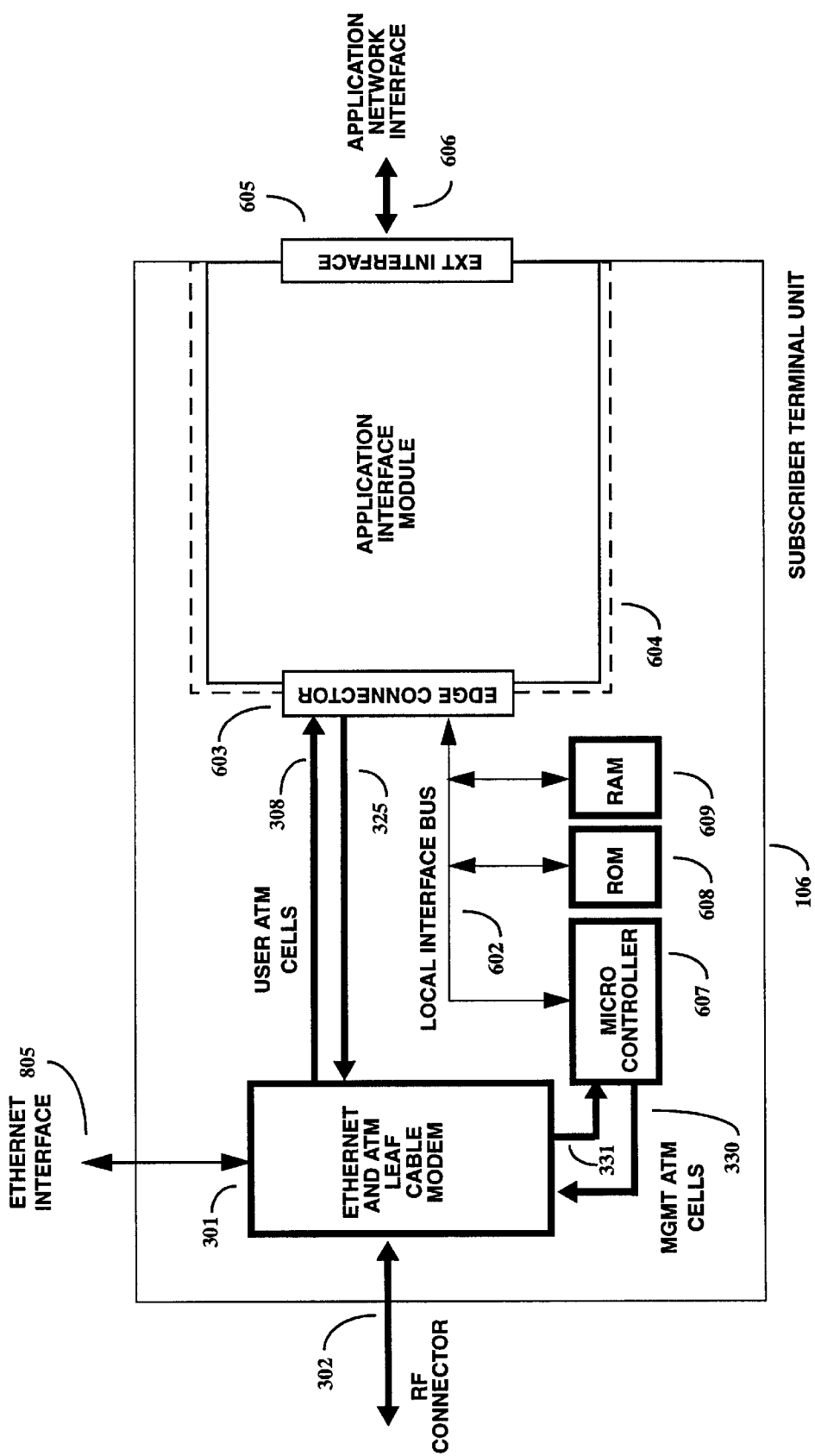
FIG. 6 shows a schematic of a subscriber terminal unit upon which the present invention may be practiced.

FIG. 6 shows a schematic of a subscriber terminal unit 106 upon which the present invention may be practiced. The STU 106 is comprised of an Ethernet and ATM Leaf Cable Modem 301 which takes the RF input from connector 302 and provides an optional ethernet interface 805. Cable Modem 301 also sends and receives user ATM cells on lines 308 and 325 as well as management ATM cells on lines 330 and 331. Consequently, lines 308 and 325 provide the means by which the data flow, in terms of user ATM cells, is routed between the Cable Modem 301 and an edge connector 603. This means of communications can take one of any number of different forms, such as a local bus, a PCI bus, a Utopia type bus, a PCMCIA bus, etc. On the other hand, the management ATM cells which provide instructions, commands, protocols, and/or control information to microcontroller 607 are routed through lines 330 and 331. Based on the management ATM cells, microcontroller 607 may then control STU 106 accordingly. In addition, software contained in the management ATM cells can be downloaded to the read only memory (ROM) 608 or random access memory (RAM) 609 via local interface bus 602. The Microcontroller 607 may select to pass the software containing instructions and/or management information to the Application Interface Module 610. Optionally, the management ATM cells may be passed directly from Cable Modem 301 to the Application Interface Module 610 via the local interface bus 602.

In the currently preferred embodiment, the Application Interface Module 610 physically fits into a receptacle or slot 604 and electrically mates with the edge connector 603. In one embodiment, AIM 610 also includes an external interface 605 which provides an Application Network Interface 606. Different versions of AIM modules 610 are implemented to provide a variety of enhancements and functionalities beyond those offered by Cable Modem 301. Hence, one can insert an AIM module 610 of choice and substitute it later with a different AIM module. When an AIM module is inserted or otherwise coupled to the STU, it must be identified to take advantage of the specific functions that are now available. There are many different ways by which the AIM module can be identified. For example, a polling method can be utilized whereby the microcontroller 607 of STU 106 periodically checks the edge connector 603 to determine whether there is an AIM module attached to it. If an AIM module is detected, microcontroller 607 transmits a query to the AIM module. In response to the query, the AIM module responds with an identifier. The identifier is indexed against a lookup table or list stored in memory 608 to determine the type and functionalities offered with that AIM module. In another embodiment, a processor residing within the AIM module can detect that the AIM module has mated with an STU. This can be accomplished by detecting power up of the AIM module when power is supplied to the AIM module by the STU through edge connector 603. Thereupon, the processor transmits an interrupt signal on local interface bus 602 to microcontroller 607 indicating the presence of the AIM module. At this point, the microcontroller 607 may transmit a query or the AIM module may voluntarily transmit an identification signal. Furthermore, the AIM module 610 is also designed so that it is hot-pluggable, such that modules may be inserted, removed, and replaced while the STU 106 is powered up and running without interfering with normal STU operations.

The software which is executed in Micro Controller 607 consists of a commonly available Real-Time Operating System (RTOS) such as the VxWorks product from Windriver Systems. The ROM 608 (either EPROM or FLASH ROM) contains the RTOS, the initial boot code for initiating the operating system, the Power-On Self-Test (POST) procedures for exercising the subscriber terminal unit 106, locating and identifying one or more Application Interface Module 604, initializing the message exchange software and the management application software for the subscriber unit 106. In the preferred embodiment, the boot code contains sufficient instructions to all the subscriber terminal unit 106 to initialize itself, perform POST, perform the registration procedure with the Head-end Controller 103, and request a software download for itself.

The registration method performs a downstream channel hunt procedure looking for an active Downstream Communications Channel 701 which is being operated by the Head-end Controller 103. After find such an active channel, the downstream RF processing of the Ethernet and ATM Leaf Cable Modem 301 synchronizes with the downstream message flow and begins to sample downstream messages. When specific registration (acquisition) messages are received by the Subscriber Terminal Unit 106 the management software will tune the Upstream Channel 702 frequency and operating parameters are directed in the downstream registration message. Once positioned, the management process will then begin the registration procedure with the Head-End Controller 103 by exchanging management messages between it and the Head-End Controller 103.

The application software in the preferred embodiment is a typical embedded controller style software development. The interface between the operating system and the hardware consists of common interfaces, register, interrupts, and control and data bus signals, etc. These hardware and functional interfaces have been omitted from the schematic of FIG. 6 due to their common availability and well understood nature by anyone skilled in the art of microprocessor hardware and software systems design and development.

The boot-code software running in the Micro Controller 607 contains a software download application process which communicates with the Headend Controller 103 for the purposes of download new operating software into the Subscriber Terminal Unit ROM 608 or RAM 609. In the preferred embodiment ROM 608 may be implemented by FLASH ROM or other programmable memory or a combination of RAM or ROM memory. The download application has the ability to download the whole new boot images or partial images that may be incrementally linked to the running operating system (incremental download).

Figure 7:
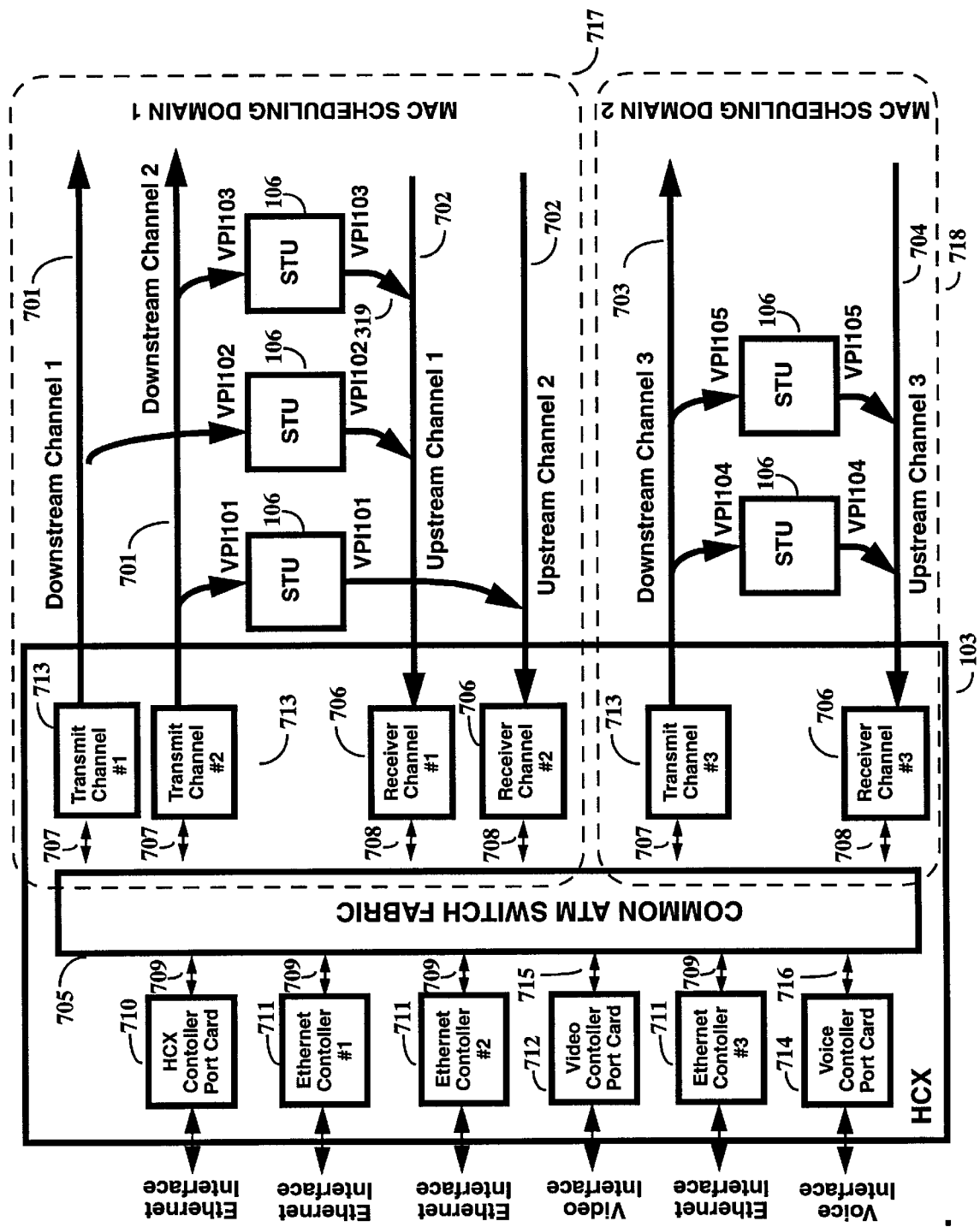
FIG. 7 shows a schematic diagram of a Headend Communications Controller supporting two MAC scheduling domains and an integrated services interface.

FIG. 7 shows a schematic diagram of a Headend Communications Controller supporting two MAC scheduling domains and an integrated services interface. HCX controller port card 710 allows an external device/network to direct and monitor the operations of the HCX, including placing of STUs 106 on channels, moving STUs from channel to channel, managing system bandwidth resources, and maintaining the station provisioning database. A number of Ethernet Controller Port Cards 711 (also referred to as Ethernet root controllers) are used to provide an interface between the HCX 710 and a number of Ethernet signals. The ethernet communications is routed according to the Common ATM Switch Fabric 705. One or more RF signals 707 containing ATM cells are sent by the transmit channel port cards 713 to the various STUs 106 via the downstream channel 701. The downstream channels 1 and 2 and upstream channels 1 and 2 comprise MAC scheduling domain 1, shown as 717. Likewise, downstream and upstream channels 3 comprise a different MAC scheduling domain 2, shown as 718. On the upstream, RF signals on channels 702 and 704 are received by Receiver Channel Port Cards 706 and input to the Common ATM Switch Fabric 705 on line 708. The integrated services interface includes Video Controller Port Card 712 and Voice Controller Port Card 714.

Figure 8:
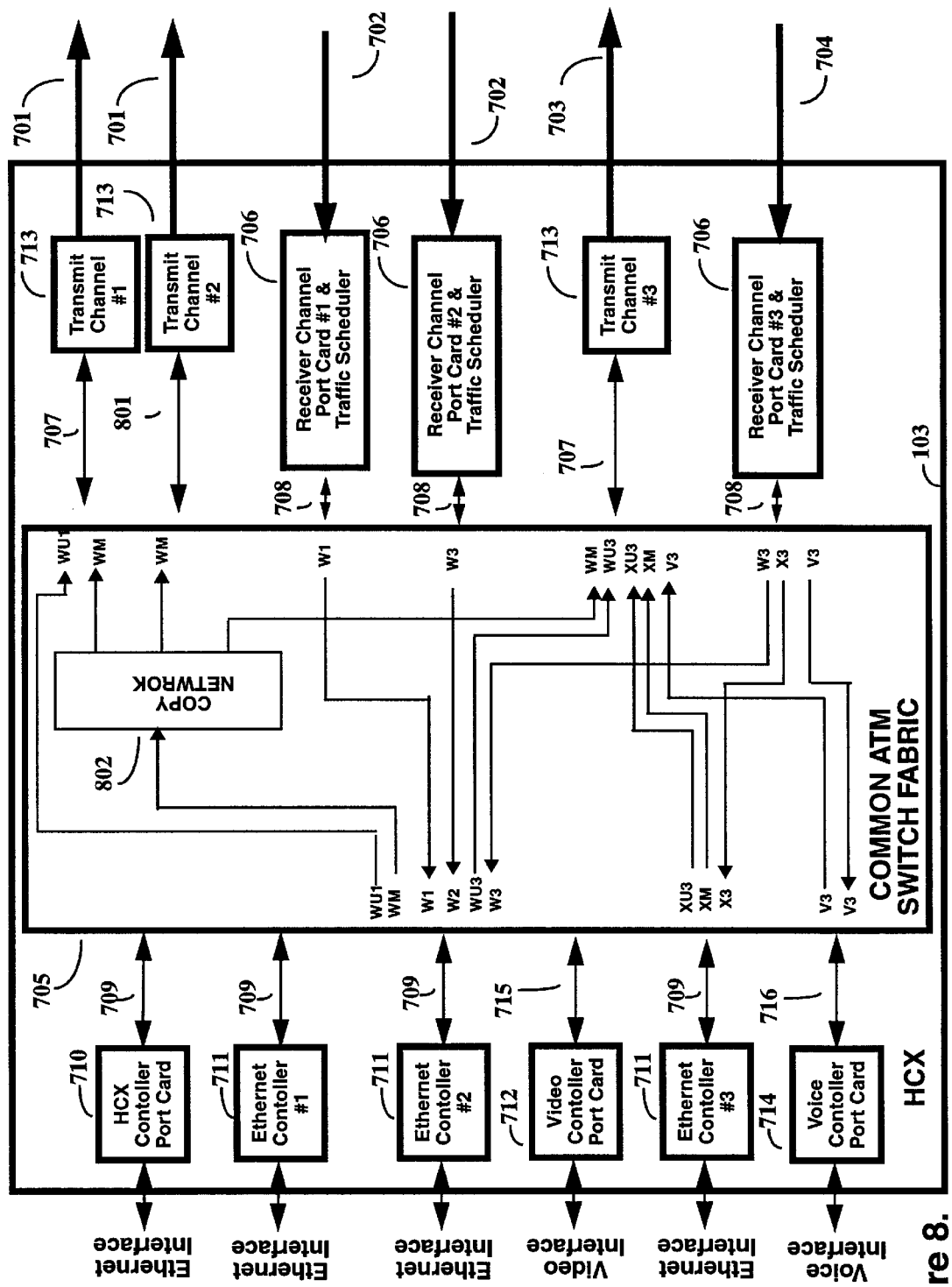
FIG. 8 is a schematic diagram illustrating how multiple Ethernet controllers can support different virtual private networks.

FIG. 8 is a schematic diagram illustrating how multiple Ethernet controllers can support different virtual private networks. In the example shown, Ethernet Controller #2 is assigned to virtual private network W, and Ethernet Controller #3 is assigned to virtual private network X. Ethernet Controller #2 can send a unicast signal (WU3) and a multicast signal (WM) to the Transmit Channel #3. Likewise, Ethernet Controller #3 can send a unicast signal (XU3) and a multicast signal (XM) to the same Transmit Channel #3 even though it has a different interface than that of Ethernet Controller #2. And because the same Transmit channel is being used, there is no need for a copy network. On the upstream side, the Receiver Channel Port Card #3 receives both unicast signals from the virtual private network W (W3) as well as from virtual private network X (X3). The W3 signal is routed through virtual circuits of the ATM Switch to Ethernet Controller #2 while the X3 signal is routed to the Ethernet Controller #3. It should be noted that the present invention allows for scalability and a variety of interconnections and configurations. This flexibility also allows one Ethernet controller to participate in multiple MAC domains and multiple Ethernet Controllers to participate in any combination of downstream channels, upstream channels, and MAC domains. Furthermore, other types of data (e.g., video, voice, future services, etc.) can be carried as virtual circuit connections. For example, the virtual circuit connection V3 from Voice Controller Port Card 714 can be established to carry voice data on the downstream channel 703 through Transmit Channel #3 by means of line 707. On the upstream, voice data on channel 704 is received by Receiver Channel Port Card #3 and Traffic Scheduler 706. This voice data is input to the Common ATM Switch Fabric 705 by line 708. A virtual circuit V3 is established to carry the upstream voice data to the Voice Controller Port Card 714 via line 716. Similarly, the same type of virtual circuit connections can be established to carry video data corresponding to Video Controller Port Card 712.

Figure 9:
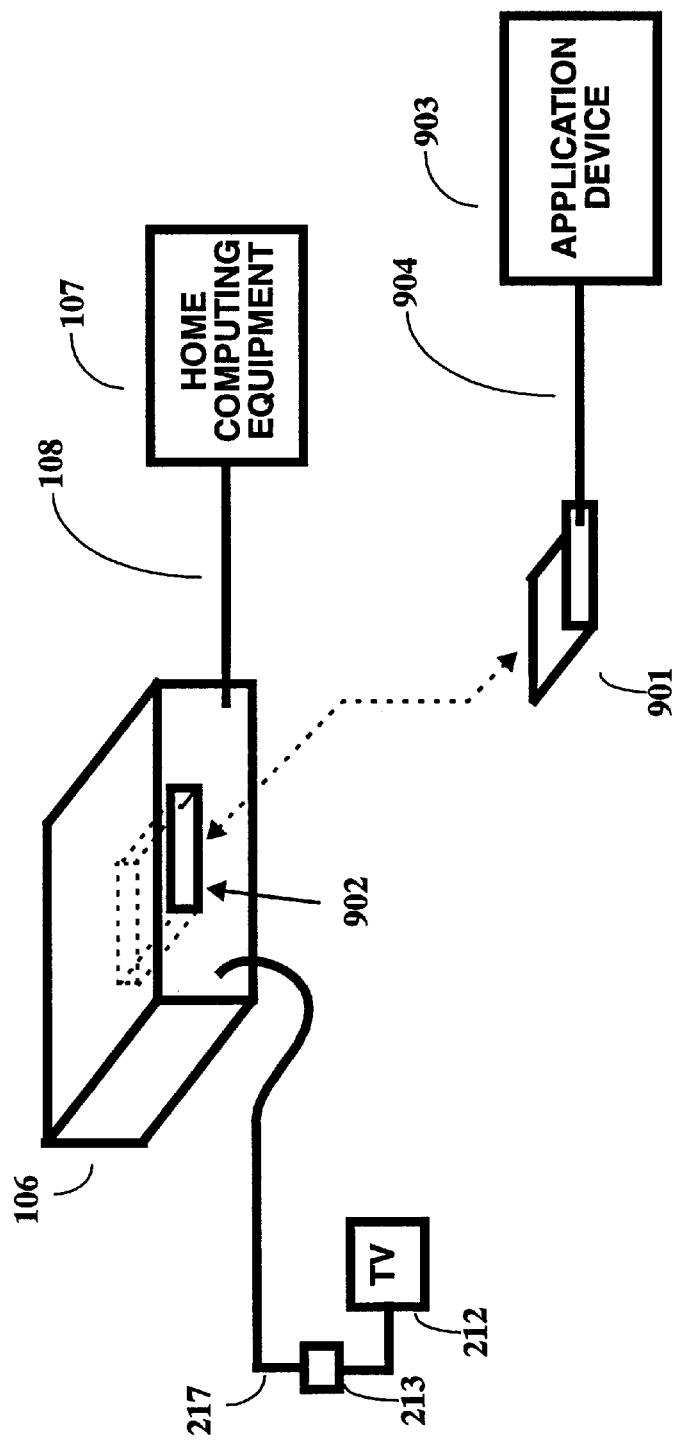
FIG. 9 shows a physical view of an STU upon which the present invention may be utilized.

FIG. 9 shows a physical view of an STU upon which the present invention may be utilized. It is shown in the currently preferred embodiment, that AIM module 901 can be inserted into and removed from a slot or receptacle 902. AIM module 901 is hot-pluggable such that it may be safely removed or inserted while the STU 106 is powered up and running. STU 106 is coupled to a standard TV 212 through coupler 213 and line 217. STU 106 may also be coupled via 108 to home computing equipment 107. Other embodiments include the AIM module physically mating with a connector on the top or sides of the STU; the AIM module can alternatively be coupled through a separate device that is in communication with the STU (e.g., a computer system); it is also feasible to implement a wireless (e.g., RF or infrared) interface between the STU and AIM module such that no actual physical contact is needed. Furthermore, the AIM module 901 may optionally include an interface to support an application device 903 through line 904. The application device 903 can be one of any number of different consumer, household, business, electronic, audio/visual, instrumentation, gaming, communications, networking, scanning, display etc., application.

Figure 10A:
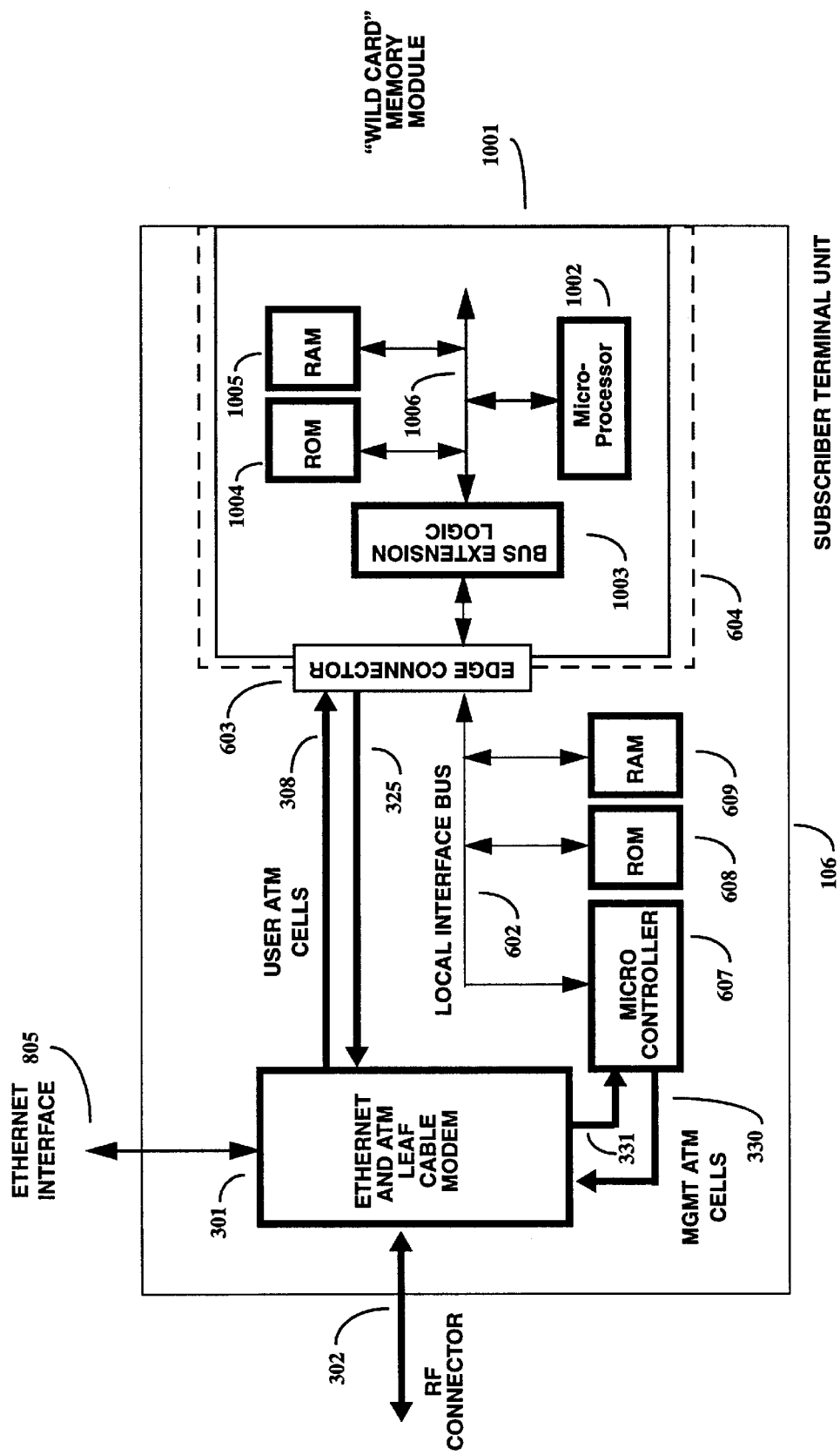
FIG. 10A shows a schematic diagram for an installation AIM module.

FIG. 10A shows a schematic diagram for an installation AIM module 1001. The installation AIM module is used to aid in reducing the amount of time it takes to install successive STUs. When an STU is first installed, it takes a relatively longer period of time to seek and lock on to an available channel, especially on the downstream. An algorithm stored as software instructions in memory (ROM 608 or RAM 609) is run by microcontroller 607 to perform the initial channel seek process. Once the downstream channel is established, the channel frequency is communicated by microcontroller 607 to microprocessor 1002 over local bus 602, through edge connector 603 and local bus 1006 to microprocessor 1002. A standard bus extension logic 1003 is used to bridge together the two local buses 602 and 1006. This frequency information is then stored in some form of nonvolatile memory (e.g., PROM, ROM, Flash ROM, RAM) 1004 or 1005. Thereupon, the cable service representative can remove the installation AIM 1001 and insert it into a different STU which is to be installed. When the Cable Modem 301 of the second STU first boots up, its microcontroller checks to determine whether an installation AIM 1001 is currently installed. If an installation AIM 1001 has been installed, microprocessor 1002 reads the list of preferred frequencies that had been previously stored in its nonvolatile memory 1004 or 1005 and conveys this information to microcontroller 607. Thereupon, microcontroller 607 tries the preferred frequencies to determine whether there is a match. If a match is found, the channel is acquired and the installation process is completed much more quickly. Otherwise, microcontroller 607 must perform the standard channel seek algorithm, which often takes much longer in time to complete. Microcontroller 607 may then add or update the preferred frequency list with the new frequency. This AIM is also referred to as a "wild card" function.

In addition to its own start-up procedures, the Subscriber Terminal Unit 106 Micro Controller 607 has the ability via hardware logic interface bus to communicate with a Application Interface Module 604. In the preferred embodiment, AIM module identification is achieve by sampling an ID code on the hardware interface for simple interfaces (those without on-board controllers) and also by exchanging messages with the AIM 604 on-board processor which is detailed in FIG. 10a. Each type of AIM 604 would have a distinctive code allowing the Micro Controller 607 to perform additional tests and configuration. In the case of a "dumb" AIM 604, the Micro Controller 607 may access RAM 1005 or FLASHROM 1004 on the AIM 604 in order to download instructions for Micro Processor 1002 (if present) or to program memory. In case of a "smart" AIM 604, the messaging software of Micro Controller 607 communicates with the message software on the Micro Processor 1002 to cause configuration changes, operational changes, to download software from the Head-End Controller to the AIM 604 FLASH ROM 1004 or RAM 1005, or to perform other activities specific to the operation of the specific AIM 604 functions. The Micro Controller 607 also has the ability to shut down or deconfigure the AIM 604 module inhibit operation. This feature is necessary so that the cable operator can authorize services that are supplied via the AIM 604. Note that other methods may be employed to identify AIM 604 cards other that those that have been described here.

The software which is executed in Micro Processor 1002 consists of commonly available Real-Time Operating System (RTOS) such as the VxWorks product from Windriver Systems. The ROM 1004 (either EPROM or FLASH ROM) contains the RTOS, the initial boot code for initializing the operating system, the Power-On Self-Test (POST) procedures for exercising the AIM 604, initializing the message exchange software and the management application software for the AIM 604. In the preferred embodiment, the boot code contains sufficient instructions to all the AIM 604 to initialize itself, perform POST, perform a message exchange with the management process running on Micro Controller 607, and initiate any necessary software downloads. In other implementations, there may be no software loaded in RAM 1005 or ROM 1004, requiring the Micro Controller 607 to write a program to RAM 1005 or FLASH ROM 1004 and then resetting the Micro Processor 1002 so that it will begin operating on the new code.

The interface between the operating system running in Micro Processor 1002 and the hardware consists of common interfaces, register interrupts, and control and data bus signals, etc. These hardware and functional interfaces have been omitted from the schematic of FIG. 10a due to their common availability and well understood nature by anyone skilled in the art of micro-processor hardware and software systems design and development.

The AIM 604 and Subscriber Terminal Unit 106 and Edge Connector 603 have been implemented as a hot pluggable device. As such, the Subscriber Terminal Unit may have be running and the AIM 604 is then inserted making contact with Edge Connector 603. In the preferred embodiment, the Micro Controller 607 continues to run but is made aware of the presence of the AIM 604 via hardware interrupt lines, a change to a status register which is periodically sample, or via message that may be placed in a shared memory portion of RAM 609 by the Micro Processor 1002. After being detected, the Micro Controller 607 can then initiate a query the Head-End Controller 103 to authorize operation of the specific type of AIM 604 and to download new software to the Subscriber Terminal Unit 106 ROM 608 or RAM 609 or to the AIM 604 RAM 1005 or ROM 1004 if required.

The specifics of the operations of the Micro Controller 607 and Micro Processor 1002 have been omitted from this embodiment as there are many different equivalent systems that may be implemented by those skilled in the art of processor to process communication mechanisms, or in processor to input/output controller operations.

Figure 10B:
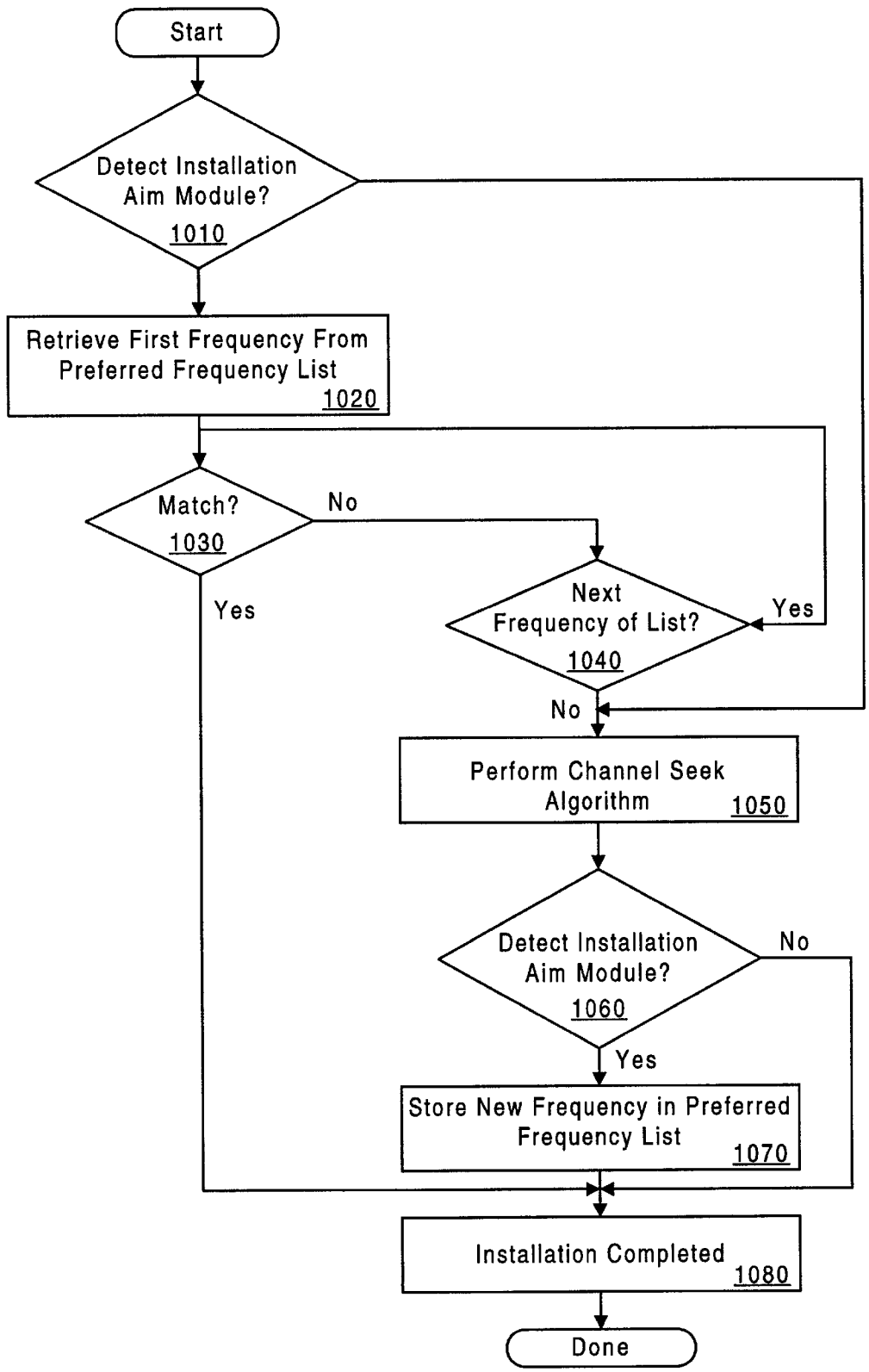
FIG. 10B is a flowchart describing the steps for performing the installation of STUs with the aid of an installation AIM module.

FIG. 10B is a flowchart describing the steps for performing the installation of STUs with the aid of an installation AIM module. When an STU first boots up during an initial installation, the STU checks to determine whether an installation AIM module or "wild card" is resident, step 1010. If the STU does not detect an installation AIM module, it performs a standard channel seek algorithm to find and access an available channel, step 1050. Otherwise, if an installation AIM module has been inserted into that STU and is detected by the STU, step 1020 reads the first frequency from the list of preferred frequencies that is stored in the AIM module. Based on this frequency, the STU determines whether there is a match with an available channel on the CATV system, step 1030. If there is a match, the installation process is complete, and the service representative removes the installation AIM module and repeats this process for subsequent installations, step 1080. Otherwise, if the first read frequency does not result in a match, the STU reads the next frequency from the preferred list of frequencies, step 1040, to determine whether there are any matches, step 1030. If all the frequencies in the list has already been tried and there are still no matches yet, the STU performs a standard algorithmic seek process to find and acquire an available channel, step 1050. At the end of successfully finding an available channel, a determination is made in step 1060 as to whether there is an installation AIM module currently residing within the STU. If there is an installation AIM module, the frequency of the available channel found in step 1050 is stored in the AIM module as part of the preferred list of frequencies, step 1070. At this point, the installation process is complete, step 1080.

Figure 11:
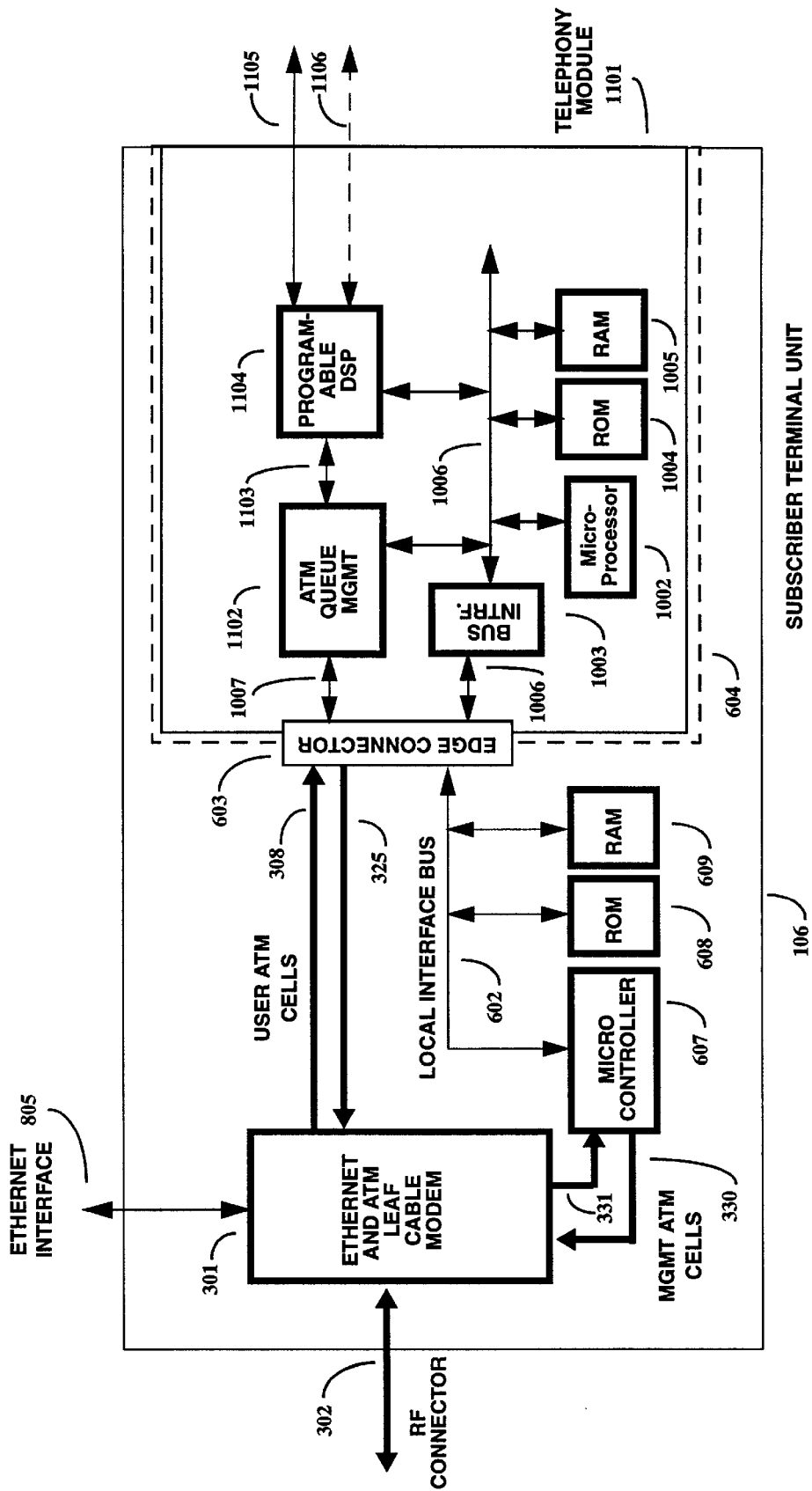
FIG. 11 shows a schematic diagram of a telephony AIM module.

FIG. 11 shows a schematic diagram of a telephony AIM module. Telephony AIM module 1101 may be inserted into the slot within the STU to provide telephony services in addition to the high speed digital data transmissions originally supported by cable modem 301. When the telephony AIM module 1101 is inserted, microcontroller 607 is informed by microprocessor 1002. Thereupon, microcontroller notifies the Headend Controller of this condition through the transmission of management cells. The HCX port card then determines whether that subscriber is authorized to make telephone calls through his or her STU. If the subscriber is authorized, the proper virtual circuits are established in the Common ATM Switch Fabric to provide voice data through the CATV system for that particular STU. Incoming and outgoing voice data is routed through the edge connector 603 to provide full duplex capability. The voice data is buffered by an ATM queue management circuit 1102, which basically serves as a first-in-first-out (FIFO) buffer. The ATM queue management circuit 1102 also performs scheduling and prioritizing functions. Optionally, software can be downloaded through the CATV system to the microcontroller 607 and/or microprocessor 1002 by means of the management cells. This software contains the instructions for enabling the STU to handle voice data and for supporting options, such as caller ID, multiple phone lines, party lines, ISDN, call forwarding, voice mail, paging, etc. These enhanced options are enabled by a standard programmable digital signal processor (DSP) chip 1104. Standard twisted pair telephone lines are input to the telephony AIM module 1101 through RJ11 jacks. Telephony AIM module 1101 can support one or more such telephone lines. In one embodiment, a subscriber line interface card (SLIC) can also be included as part of the telephony AIM module 1101. In another embodiment, the telephony AIM module 1101 supports Basic Rate ISDN (BRI) and/or T1/E1 circuits.

Figure 12:
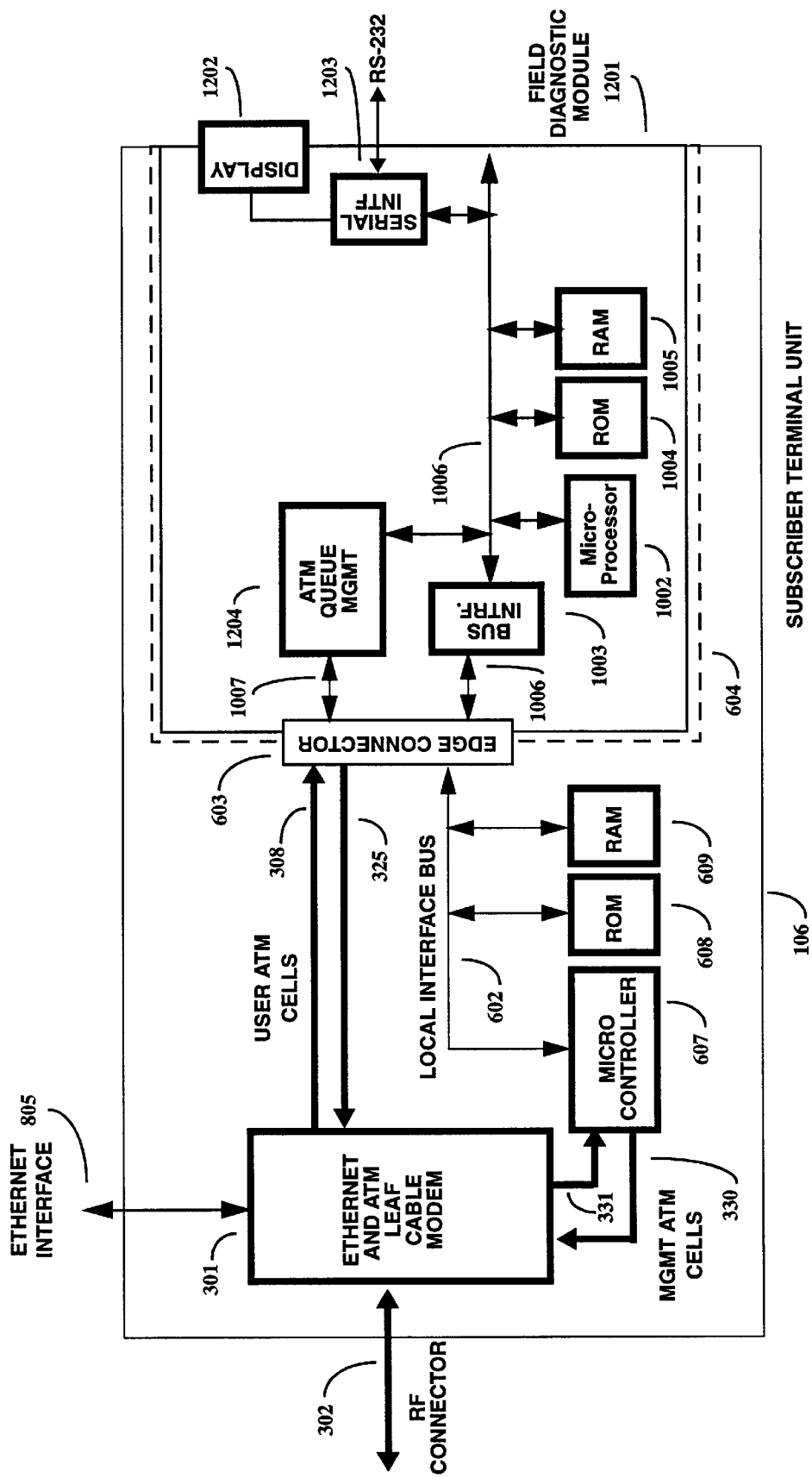
FIG. 12 shows a schematic diagram of a field diagnostic AIM module.

FIG. 12 shows a schematic diagram of a field diagnostic AIM module. If a subscriber's STU is malfunctioning, a service technician is sent to test the STU. The service technician first inserts the field diagnostic AIM module 1201 in the STU, either while the STU is up and running or rebooting the STU upon insertion. Microcontroller 607 detects the presence of field diagnostic AIM module 1201 and places the STU in a test mode so that field diagnostics can be performed. There are a number of tests which can be executed with the field diagnostic AIM module 1201 in place. For example, software contained in memory 1004 or 1005 can cause microprocessor 1002 to analyze certain cells up and down the entire CATV system. In addition, special test cells can be transmitted to test particular parts of the STU, fiber-coax network, or the Headend unit. Furthermore, the STU's performance characteristics (e.g., bit error rate, frequencies, etc.) can be determined. The contents of the STU's memory can also be scanned to determine the state of the STU. A serial interface (e.g., RS-232) 1203 is optionally provided so that other test equipment can be coupled to the STU via the field diagnostic AIM module 1201. Moreover, a computer system (e.g., a laptop or portable computer) can be used to run tests through the serial interface 1203. The results of these tests and diagnostics can be displayed on an LCD display 1202, by the test equipment, or computer system. It should be noted that the field diagnostic AIM module 1201 gives the service technician the ability to override many of the normal functions and operations associated with the STU. Furthermore, communications with the headend unit for testing purposes can be established, and software from the headend unit can be downloaded to the AIM module or STU memory. The software can be custom tailored to test different types and configurations of STUs and their respective circuits, features, options, and functions. For example, software can be invoked to read the contents stored in memory, noise or some other source of error can intentionally be injected for testing circuits, test messages can be routed the length of the cable network including the headend controller and cards to test any part or combination of the network, frequency measurements can be taken, the signal to noise ratio can be measured, signal amplitudes and power levels can be checked, etc.

By having the field diagnostic functions as a separate AIM module, costs are reduced because rather than incorporating the diagnostic circuitry into each and every STU, a few field diagnostic AIM modules can service a multitude of STUs. Moreover, because the field diagnostic AIM module 1201 is detachable, the field technician can remove the module from the STU when diagnostics is completed on that particular STU and carry the AIM module to the next STU for troubleshooting. Hence, it is possible to restrict access of the diagnostic AIM modules to only authorized service technicians, thereby preventing subscribers from gaining access to diagnostic functions.

Figure 13:
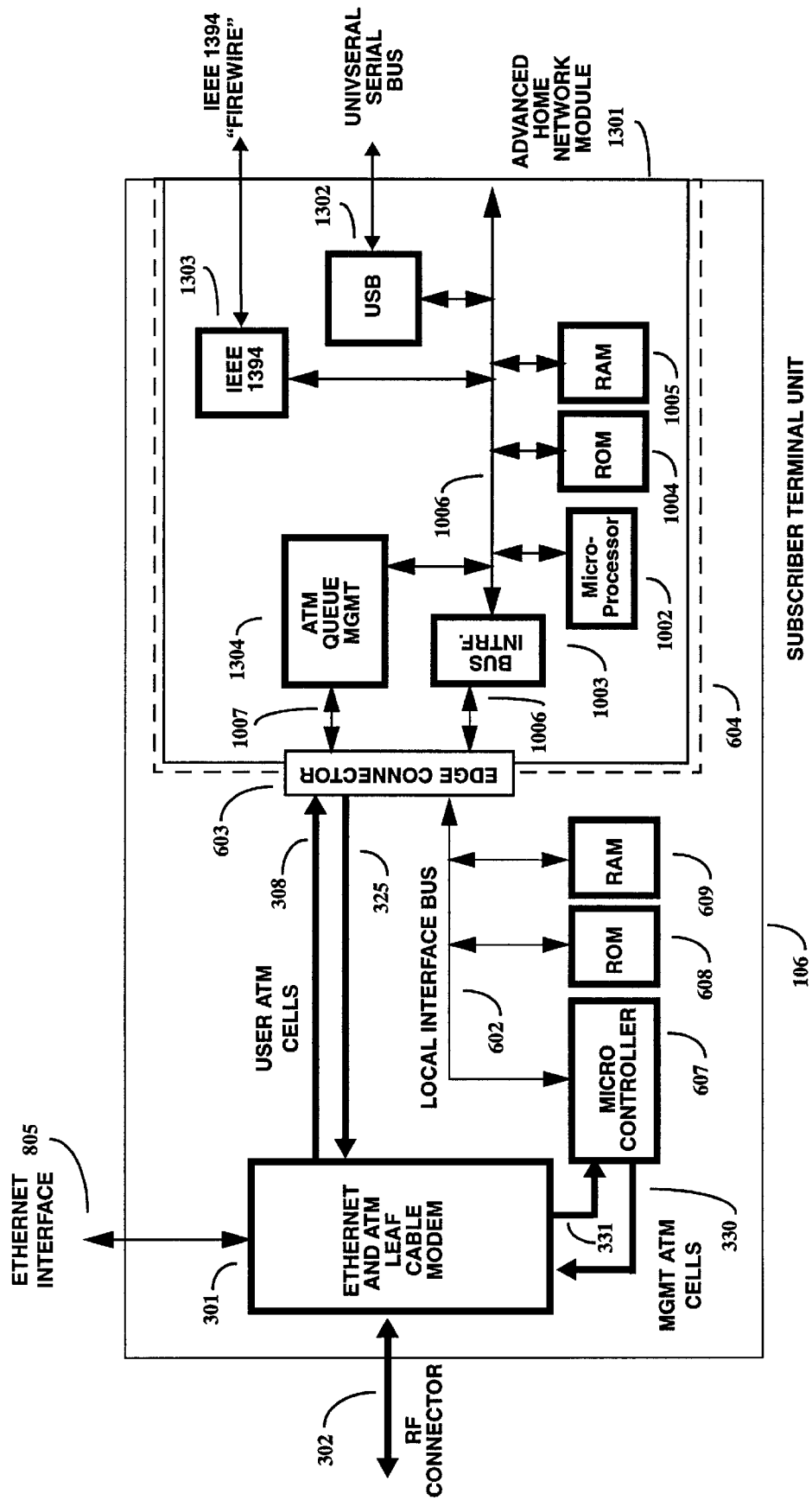
FIG. 13 shows a schematic diagram of an advanced home interface module.

FIG. 13 shows a schematic diagram of an advanced home interface module 1301. The advanced home interface module 1301 provides enhanced network interface(s) for supporting formats and standards other than Ethernet. In the currently preferred embodiment, support is provided by advanced home network module 1301 for consumer based interfaces. For example, an IEEE 1394 block 1303 can be coupled onto the local bus 1006 to receive and send data in the form of IEE 1394 or "Firewire." The user may choose to include a Universal Serial Bus (USB) connection via USB block 1302. Hence, home electronics (e.g., stereo, HDTV, VCR, camcorder, joystick, mouse, keyboard, phone, USB device, etc.) can interface with the STU via the advanced home interface module 1301. The advanced home interface module 1301 can be adapted and has the flexibility to provide interfaces to meet future standards. Again, notification and authorization are made by utilizing the management ATM cells. Furthermore, in the currently preferred embodiment, all information (e.g., Ethernet, IEEE 1394, USB, etc.) is converted into ATM cells which are transmitted through the CATV system and later re-converted back as necessary. Thereby, packets from the headend controller can be output from advanced home interface module 1301 as IEEE 1394 or USB; IEEE 1394 or USB data can be input to the STU via the advanced home interface module 1301; IEEE 1394 data can be input through one port of the advanced home interface module 1301 and output as USB on a separate port of the advanced home interface module 1301; IEEE 1394 data can be input through one port of the advanced home interface module 1301 and output as IEEE 1394 data on a separate port of the advanced home interface module 1301; USB data can be input through one port of the advanced home interface module 1301 and output as IEEE 1394 on a separate port of the advanced home interface module 1301; and USB data can be input through one port of the advanced home interface module 1301 and output as USB data on a separate port of the advanced home interface module 1301. This is all made possible by microprocessor 1002 recognizing the format of the incoming signal and converting the incoming signal into ATM packets for routing purposes. For example, the signals received by IEEE 1394 block 1303 are converted from IEEE 1394 format by microprocessor 1002 into ATM packets. These ATM packets can then be routed upstream to the headend controller. The same or different ATM packets can be converted into USB format by microprocessor 1002 for output by the USB block 1302.

Figure 14:
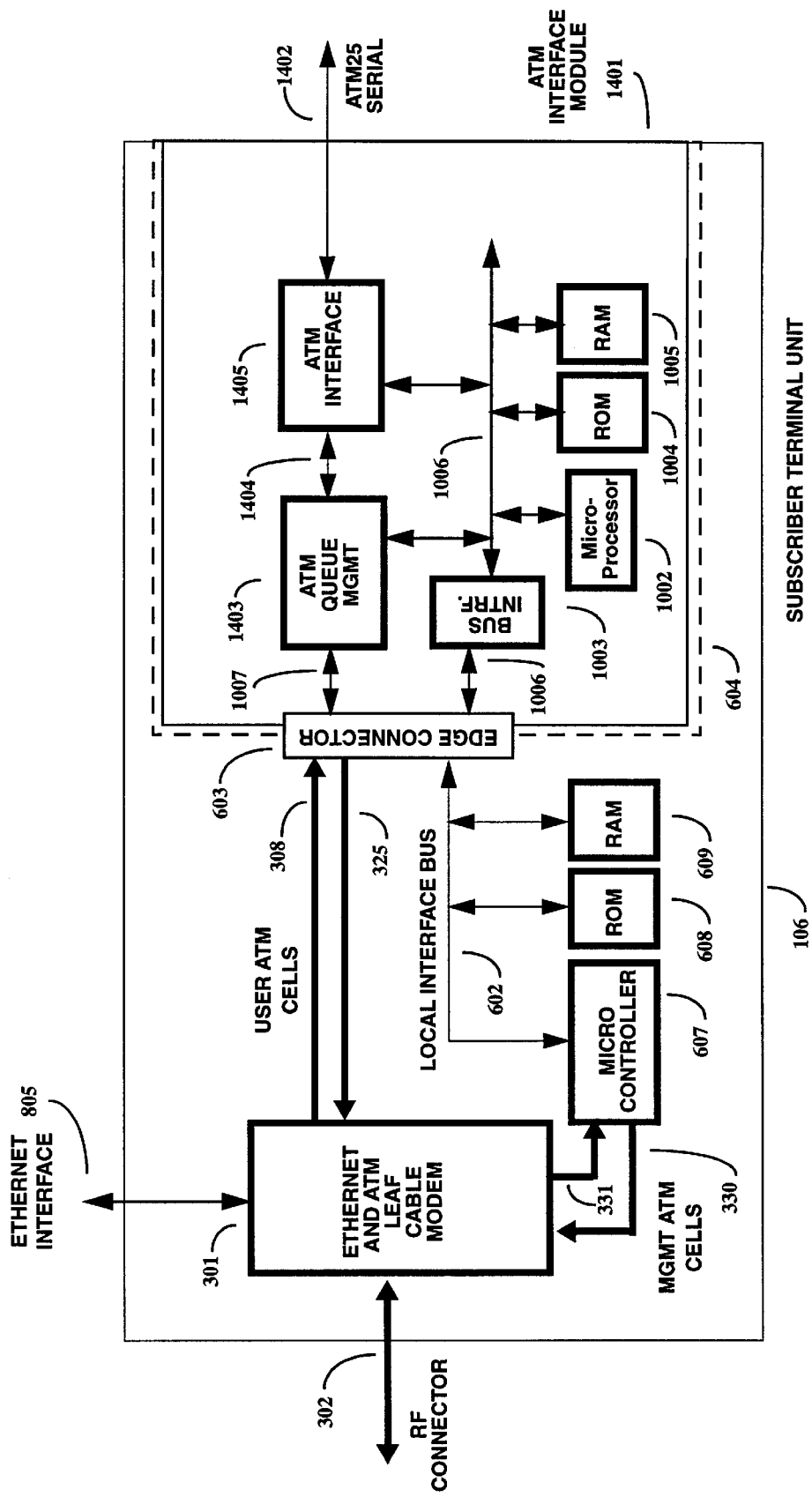
FIG. 14 shows a schematic diagram of an Asynchronous Transfer Mode AIM module.

FIG. 14 shows a schematic diagram of an Asynchronous Transfer Mode AIM module. The Asynchronous Transfer Mode AIM module 1401 is used to provide support for an ATM25 cell path to and from the STU. ATM cells are input to an ATM interface 1405. User ATM cells are then queued, buffered, and scheduled by ATM Queue Manager 1403 before being transferred over edge connector 603 to the Cable Modem 301. Furthermore, microprocessor 1002 may provide bridging, gateway, packet conversion, or directory services. Thereby, packets can be readily monitored and/or exchanged through interfaces 1302–1303 or the RF.

Figure 15:
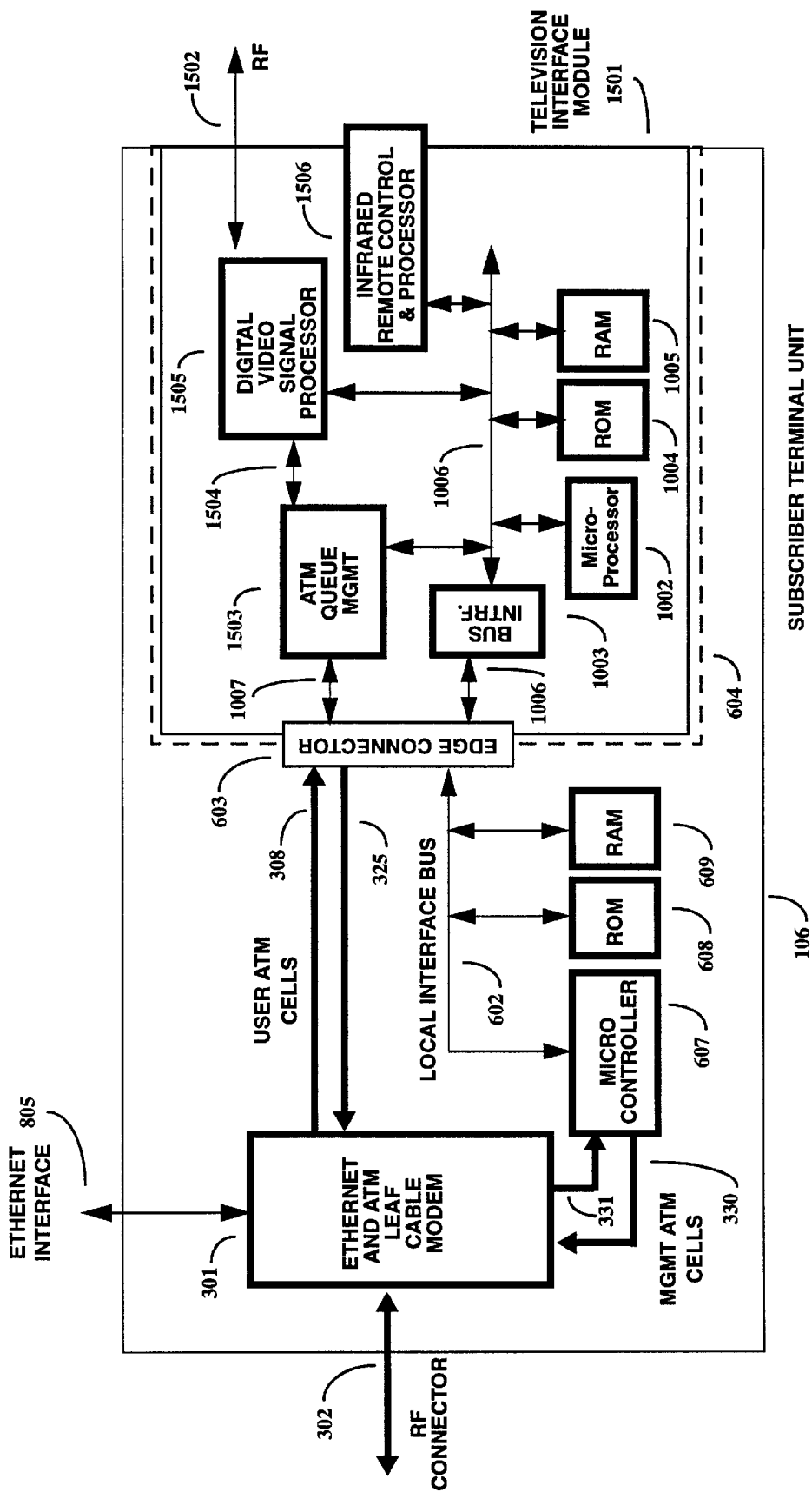
FIG. 15 shows a schematic diagram of a Television AIM module.

FIG. 15 shows a schematic diagram of a Television AIM module. The Television AIM module 1501 is used to provide a TV interface for the Cable Modem 301. Standard ATM cells containing video data is sent via line 308 downstream to edge connector 603 and ATM Queue Manager 1503. The ATM cells are then input on line 1504 to the Digital Video Signal Processor 1505 which converts the ATM cells into standard NTSC or HDTV television signals which are input as RF to the subscriber's television set on line 1502. Various TV control functions (e.g., channel selection, volume control, picture-in-picture, sound, contrast, etc.) can be implemented by means of an Infrared Remote Control & Processor 1506. Furthermore, video-on-demand functionality is provided by converting infrared commands to packets for transfer to the video controller in the headend unit for further processing. A subscriber can select any one of a number of movies to receive. The selection is input via the Remote Control 1506 and conveyed by microprocessor 1002 to microcontroller 607. The selection is then transmitted upstream in the form of one or more management ATM cells to the HCX Controller. Based on this information, the appropriate movie title is then retrieved from a disk array or other mass storage device. The appropriate virtual connections are established and the video is sent downstream by the Video Controller Port Card to the requesting STU in the form of ATM cells. These ATM cells are then converted by the Digital Video Signal Processor 1505 into RF signals for input to the subscriber's TV set.

Figure 16:
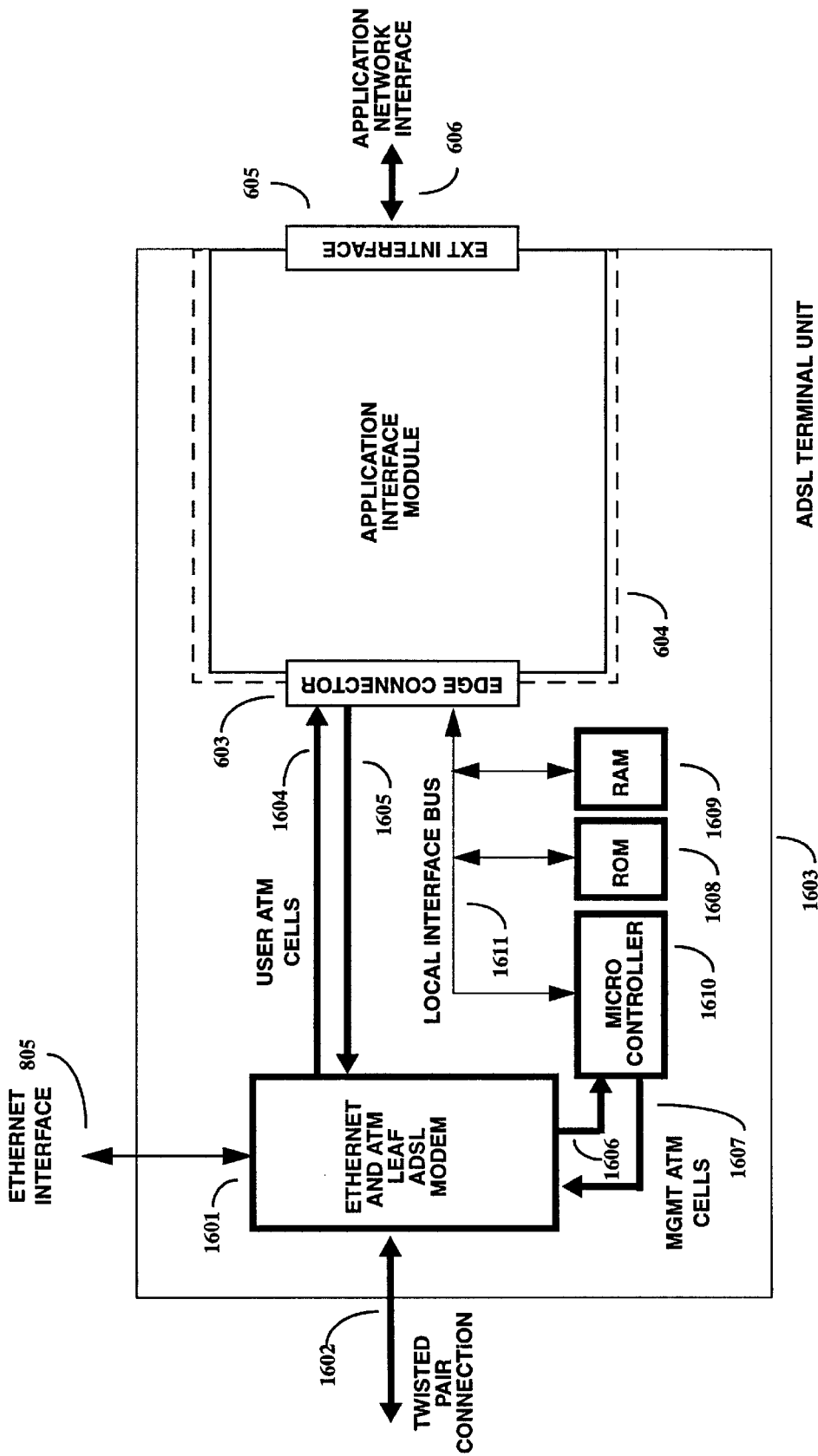
FIG. 16 shows a schematic diagram of an ADSL terminal unit which has an AIM module interface.

FIG. 16 shows a schematic diagram of an ADSL terminal unit that has an interface with an application interface module. For purposes of the detailed description and in the claims, the term ADSL is used to include all the different types of Digital Subscriber Line (DSL) technologies, such as Rate Adjustable Digital Subscriber Line (RADSL), Symmetric Digital Subscriber Line (SDSL), High Speed Digital Subscriber Line (HDSL), etc. The different types of DSL refers only to the amount of bandwidth being used in the upstream and downstream. FIG. 16 is similar to that of an STU described above, except that the Ethernet and ATM Leaf ADSL Modem 1601 replaces the Ethernet and ATM Leaf Cable Modem 301 of FIG. 3. The RF parts are replaced with commonly available ADSL to ATM components. Specifically, the Cable Modem RF to ATM Receiver 305, the Diplexor 303, and the Cable Modem ATM to RF Transmitter 328 have been replaced with commonly available chipset that interfaces ADSL to ATM. One such commercially available chipset is the DynaMiTe MTK-20120 series (including the MTC-20124 Analog Front-end, MTC-20125 Modem, and MTC-20126 ATM Handler) manufactured by Alcatel Telecom of Paris, France. Data interfaces with the ADSL terminal unit 1603 through the twisted pair connection 1602 according to established ADSL standards. Within the ADSL terminal unit 1603, Ethernet and ATM Leaf ADSL Modem 1601 transmits and receives ATM cells containing user data on lines 1604 and 1605 to/from the edge connector 603. Edge connector 603 provides the interface to a detachable AIM module which gives enhanced functionality to the ADSL terminal unit 1603. Again, the ATM cells containing management information are conveyed on lines 1606 and 1607 to/from microcontroller 1610. Data as well as software on local interface bus 1611 can be stored by the ROM 1608 or RAM 1609 memories.

Figure 17:
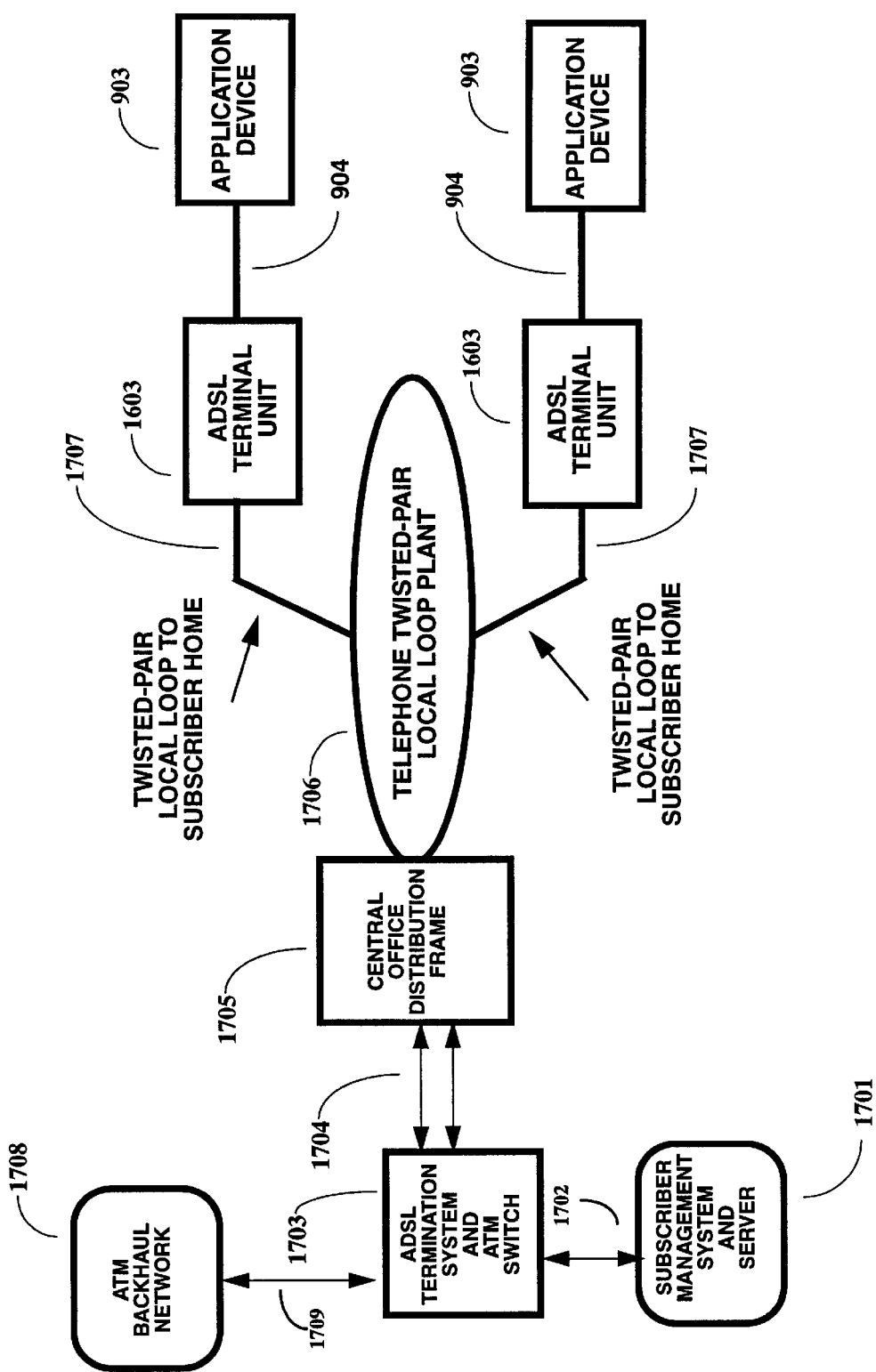
FIG. 17 shows a representative model of an ADSL delivery system for supporting an ADSL terminal unit.

FIG. 17 shows a representative model of an ADSL delivery system for supporting an ADSL terminal unit. FIG. 17 shows the interconnects between a Subscriber Management System And Server 1701, through an ATM link 1702, to the ADSL Termination System and ATM Switch 1703. The Subscriber Management System And Server 1701 provides equivalent functions as the Headend Controller. For instance, an ADSL terminal unit can dial in over the ATM network provided by the ADSL, contact the manager, establish proper authorization, and request software downloads which are serviced by the server 1701. The ADSL Termination System 1703 interfaces through the copper local loop 1704 into a Central Telephone Office Distribution Frame 1705 which has access to the copper pair local loops. The actual Local Loop Plant is shown as 1706 which distributes twisted-pair local loops 1707 out from the Central Office 1705 to reach subscriber premises. The ADSL Terminal Units 1603 connect up to 1707. The ADSL Termination System and ATM Switch 1703 is also coupled through line 1709 to an ATM Backhaul Network 1708 which grants access to the Internet as well as other types of networks.

Figure 18:
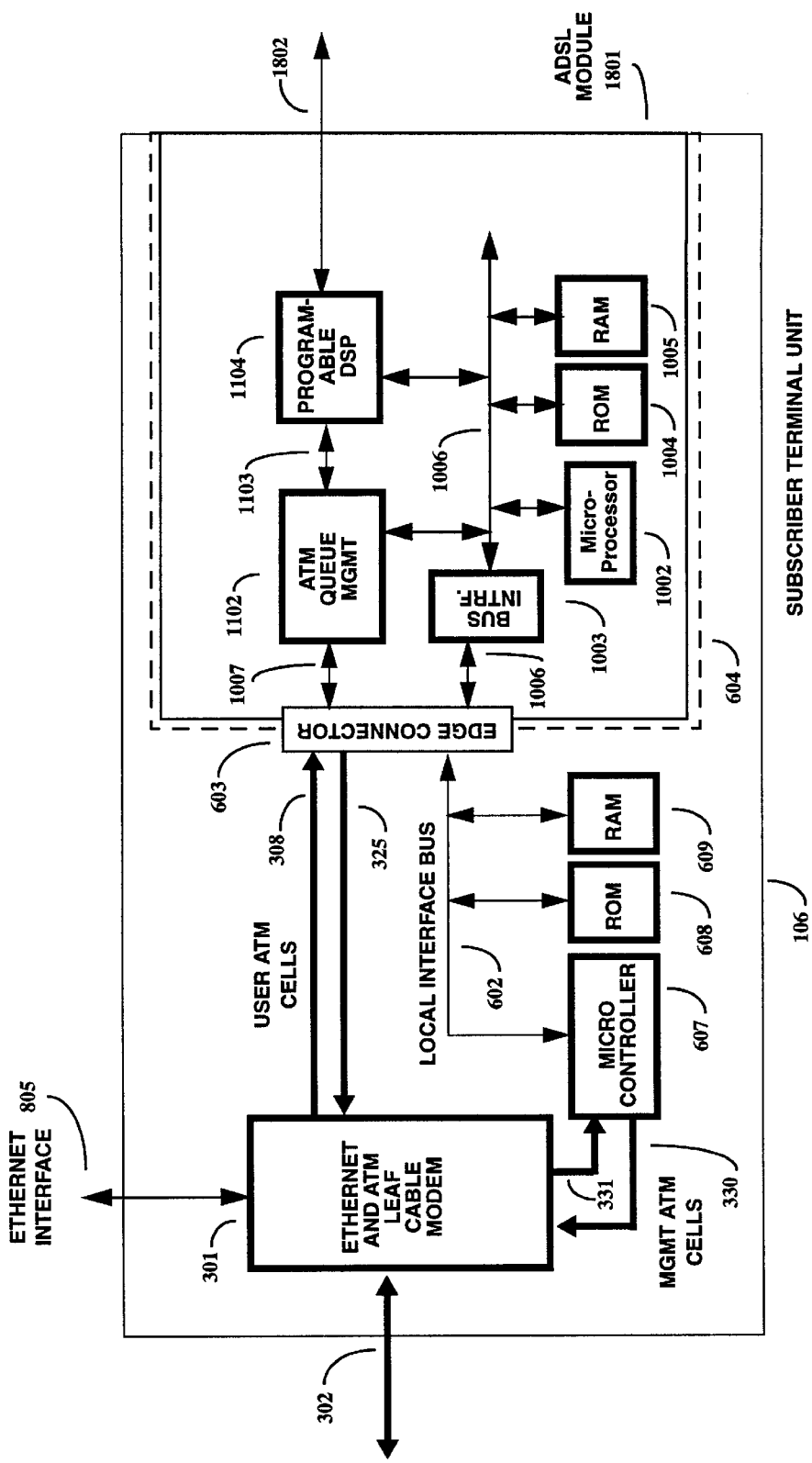
FIG. 18 shows a subscriber terminal unit having an ADSL AIM module.

FIG. 18 shows a subscriber terminal unit having an ADSL AIM module 1801. An ADSL device can be coupled to the ADSL module 1801 through twisted pair wires 1802 to a programmable DSP 1104. The programmable DSP 1104 converts incoming ADSL data to ATM cells for input to the ATM Queue Management 1102 and local bus 1006. These ATM cells containing ADSL data are sent to the Ethernet and ATM Leaf Cable Modem 301 which performs the packet conversion and ATM transmission. The programmable DSO 1104 also converts ATM cells received by the STU 106 from the cable network line 302 back to ADSL data for output to the connected ADSL device on line 1802. Thereby, with the STU 106 and ADSL module 1801 combination, an ADSL device (e.g., ADSL modem) can be transparently supported through a cable network which perform the same services equivalent to that of a central office telephone twisted-pair.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A subscriber terminal unit for transmitting signals upstream to a headend unit and receiving signals downstream from a headend controller through a cable network, comprising:

an application interface module coupled to the subscriber terminal unit comprising an installation module used in installing the subscriber terminal unit, wherein the application interface module is capable of being coupled to and decoupled from the connector while the subscriber terminal unit is in operation without disrupting normal operations;

a connector coupled to the subscriber terminal unit for electrically coupling the application interface module to circuitry within the subscriber terminal unit;

memory coupled to the connector for storing instructions or data;

a processor coupled to the memory for processing data received by the subscriber terminal unit from the headend controller.

2. The subscriber terminal unit of claim 1, wherein the installation module includes a memory for storing channel information corresponding to a channel of a previously installed subscriber terminal unit.

3. The subscriber terminal unit of claim 1, wherein the application interface module is comprised of a telephony module having a digital signal processor for providing telephony functions to the subscriber terminal unit.

4. The subscriber terminal unit of claim 3, wherein when the telephony module is inserted into the subscriber terminal unit, the subscriber terminal unit transmits ATM cells containing management information for establishing a virtual circuit so that voice data is routed through an ATM switch in an ATM packet format according to the virtual circuit.

5. The subscriber terminal unit of claim 1, wherein the application interface module is comprised of a field diagnostic module used to conduct diagnostics on the subscriber terminal unit.

6. The subscriber terminal unit of claim 5, wherein the field diagnostic module includes a serial interface for coupling an external instrument used to test the subscriber terminal unit.

7. The subscriber terminal unit of claim 5, wherein the field diagnostic module includes a display for displaying a test result.

8. The subscriber terminal unit of claim 6, wherein the external instrument downloads testing software into the memory of the subscriber terminal unit.

9. The subscriber terminal unit of claim 1, wherein the application interface module is comprised of a home network module used for interfacing the subscriber terminal unit with one or more consumer network interfaces, wherein one of the consumer network interfaces includes an IEEE 1394 interface.

10. The subscriber terminal unit of claim 9, wherein data in the IEEE 1394 format input through the home network module is converted to packets which are sent to the headend controller and packets from the headend controller are converted into the IEEE 1394 format for output by the home network module.

11. The subscriber terminal unit of claim 9, wherein one of the consumer network interfaces includes an universal serial bus interface.

12. The subscriber terminal unit of claim 11, wherein data in the universal serial bus format input through a network interface module is converted to packets which are sent to the headend controller and packets from the headend controller are converted into the universal serial bus format for output by the home network module.

13. The subscriber terminal unit of claim 9, wherein the home network module includes at least a first port for inputting and outputting either IEEE 1394 or universal serial bus data to/from a first device and a second port for inputting and outputting either IEEE 1394 or universal serial bus data to/from a second device and wherein the first device is in communications with the second device.

14. The subscriber terminal unit of claim 9, wherein one of the consumer network interfaces includes an asynchronous transfer mode interface.

15. The subscriber terminal unit of claim 1, wherein the application interface module is comprised of a television module for accepting video data from the headend controller and generating an RF television signal.

16. The subscriber terminal unit of claim 13, wherein a television module includes an infrared remote controller circuit for accepting user commands which are transmitted to the headend controller in packets.

17. A method for enhancing the functionality of a subscriber terminal unit for use in a cable network having a headend controller, comprising the steps of:

coupling the subscriber terminal unit to the cable network;

exchanging communications between the headend controller and the subscriber terminal unit;

determining whether an application interface module is in communications with the subscriber terminal unit;

identifying which function is provided by the application interface module;

transmitting management information from the subscriber terminal unit upstream to a headend unit specific to the application interface module in communications with the subscriber terminal unit;

providing applications services for the subscriber terminal unit by the headend unit in response to the management information.

18. The method of claim 17, wherein installation of a first subscriber terminal unit includes the steps of:

coupling an installation module as a device to the subscriber terminal unit;

determining an available channel on the cable network for transmissions by the first subscriber terminal unit;

storing channel information corresponding to the available channel within a memory of the installation module.

19. The method of claim 18, wherein installation of a second subscriber terminal unit includes the steps of:

coupling the installation module to the second subscriber terminal unit;

reading the channel information stored in the memory of the installation module;

determining whether the channel according to the channel information is available, wherein if the frequency is available, the subscriber terminal unit is assigned that particular frequency and if the frequency is not available, the subscriber terminal unit performs a seek algorithm to find a different channel that is available.

20. The method of claim 19 further comprising the step of storing a frequency of the different channel within the memory of the installation module.

21. The method of claim 17 further comprising the step of hot plugging the device into the subscriber terminal unit.

22. The method of claim 17 further comprising the step of the headend unit providing telephony functions to the subscriber terminal unit according to a telephone module which is inserted in the subscriber terminal unit as the device.

23. The method of claim 22 further comprising the step of establishing a virtual circuit in response to a management signal so that voice data is routed through an ATM switch in an ATM packet format according to the virtual circuit.

24. The method of claim 17 further comprising the step of performing diagnostics on the subscriber terminal unit according to a field diagnostic module that was inserted as the device into the subscriber terminal unit by a service technician.

25. The method of claim 24 further comprising the step of transmitting commands to the field diagnostic module by a computer system through a serial interface for testing the subscriber terminal unit.

26. The method of claim 24 further comprising the step of displaying a test result that was performed on a display of the field diagnostic module.

27. The method of claim 17 further comprising the step of coupling a home network module to the subscriber terminal unit for handling consumer network data.

28. The method of claim 27, wherein the consumer network data has an IEEE 1394 format.

29. The method of claim 28 further comprising the steps of:

converting the IEEE 1394 format data input through the home network module to packets;

sending the packets to the headend controller;

converting packets sent by the headend controller and received by the home network module into the IEEE 1394 format for output by the home network module.

30. The method of claim 29, wherein the packets are carried in ATM cells.

31. The method of claim 27 further comprising the step of providing an universal serial bus interface through the home network module.

32. The method of claim 31 further comprising the steps of:

converting a universal serial bus format data input through the home network module to packets;

sending the packets to the headend controller;

converting packets sent by the headend controller and received by the home network module to the universal serial bus format for output by the home network module.

33. The method of claim 32, wherein the packets are carried in ATM cells.

34. The method of claim 27 further comprising the step of providing an asynchronous transfer mode interface through the application interface module.

35. The method of claim 17 further comprising the steps of:
accepting video data from the headend controller;
converting the video data by a television module inserted in the subscriber terminal unit as the device;
outputting an RF television signal by the television module.

36. The method of claim 35 further comprising the steps of:
accepting user commands through an infrared remote controller circuit in the television module;
transmitting management information upstream in response to the user commands;
servicing the user commands by a headend unit.

37. The method of claim 17 further comprising the step of downloading software through the cable network to the subscriber terminal unit for supporting the device.

38. The method of claim 17 further comprising the step of downloading software through the cable network to the device for supporting a function offered by the device.

39. The method of claim 17 further comprising the step of coupling an ADSL interface module to the subscriber terminal unit.

40. The method of claim 17 further comprising the step of coupling an ADSL interface module to the ADSL terminal unit.

41. A method for installing a subscriber terminal unit for use in a cable network having a headend controller, comprising the steps of:
coupling the subscriber terminal unit to the cable network;
exchanging communications between the headend controller and the subscriber terminal unit;
determining whether an installation module is in communications with the subscriber terminal unit, wherein if the installation module is in communications with the subscriber terminal unit;
reading channel information stored on the installation module;
determining whether a channel according to the channel information is available;
transmitting information on the channel if the channel is available.

42. The method of claim 41, wherein if the channel is not available:
determining an available channel;
storing the available channel information on the installation module for use in a subsequent subscriber terminal unit installation.

43. An application interface module for adding functionality to a subscriber terminal unit, comprising:
a connector for coupling the application interface module to the subscriber terminal unit;
a bus coupled to the connector;
memory coupled to the bus for storing instructions or data, wherein the memory contains identification information for identifying a particular function of the application interface module;
a processor coupled to the bus for transmitting management information from the application interface module to the subscriber terminal unit, wherein the subscriber terminal unit transmits a request for applications services from a headend controller in response to the management information.

44. The application interface module of claim 43 providing an installation function.

45. The application interface module of claim 43 providing a home network function.

46. The application interface module of claim 43 providing a telephony function.

47. The application interface module of claim 43 providing a diagnostic function.

48. The application interface module of claim 43 providing an ADSL function.

49. An Asymmetric Digital Subscriber Line (ADSL) terminal unit for transmitting signals over a twisted pair local loop to an ADSL termination system and receiving signals from the ADSL termination system through a telephone twisted pair network, comprising:
an application interface module coupled to the ADSL terminal unit;
a connector coupled to the ADSL terminal unit for electrically coupling the application interface module to circuitry within the ADSL terminal unit;
memory coupled to the connector for storing instructions or data;
a processor coupled to the memory for processing data received by the ADSL terminal unit from a subscriber management system and server.

50. The ADSL terminal unit of claim 49, wherein the application interface module is capable of being coupled to and decoupled from the connector while the ADSL terminal unit is in operation without disrupting normal operations.

51. The ADSL terminal unit of claim 49, wherein the application interface module is comprised of a telephony module having a digital signal processor for providing telephony functions to the ADSL terminal unit.

52. The ADSL terminal unit of claim 51, wherein when the telephony module is inserted into the ADSL terminal unit, the ADSL terminal unit transmits ATM cells containing management information for establishing a virtual circuit so that voice data is routed through an ATM switch in an ATM packet format according to the virtual circuit.

53. The ADSL terminal unit of claim 49, wherein the application interface module is comprised of a field diagnostic module used to conduct diagnostics on the ADSL terminal unit.

54. The ADSL terminal unit of claim 53, wherein the field diagnostic module includes a serial interface for coupling an external instrument used to test the ADSL terminal unit.

55. The ADSL terminal unit of claim 53, wherein the field diagnostic module includes a display for displaying a test result.

56. The ADSL terminal unit of claim 54, wherein the external instrument downloads testing software into the memory of the ADSL terminal unit.

57. The ADSL terminal unit of claim 49, wherein the application interface module is comprised of a home network module used for interfacing the ADSL terminal unit with one or more consumer network interfaces.

58. The ADSL terminal unit of claim 57, wherein one of the consumer network interfaces includes an IEEE 1394 interface.

59. The ADSL terminal unit of claim 58, wherein data in an IEEE 1394 format input through a home network module is converted to packets which are sent to a headend controller and packets from the headend controller are converted into the IEEE 1394 format for output by the home network module.

60. The ADSL terminal unit of claim 57, wherein one of the consumer network interfaces includes an universal serial bus interface.

61. The ADSL terminal unit of claim 60, wherein data in a universal serial bus format input through a network interface module is converted to packets which are sent to a headend controller and packets from the headend controller are converted into the universal serial bus format for output by the home network module.

62. The ADSL terminal unit of claim 57, wherein the home network module includes at least a first port for inputting and outputting either IEEE 1394 or universal serial bus data to/from a first device and a second port for inputting and outputting either IEEE 1394 or universal serial bus data to/from a second device and wherein the first device is in communications with the second device.

63. The ADSL terminal unit of claim 57, wherein one of the consumer network interfaces includes an asynchronous transfer mode interface.

64. The ADSL terminal unit of claim 49, wherein the application interface module is comprised of a television module for accepting video data from a headend controller and generating an RF television signal.

65. The ADSL terminal unit of claim 64, wherein the television module includes an infrared remote controller circuit for accepting user commands which are transmitted to the headend controller in packets.

66. A method for enhancing the functionality of an Asymmetric Digital Subscriber Line (ADSL) terminal unit for use in a twisted pair telephone network having an ADSL termination system, comprising the steps of:
    coupling the ADSL terminal unit to the twisted pair telephone network;
    exchanging communications between the twisted pair telephone network and the ADSL terminal unit;
    determining whether an application interface module is in communications with the ADSL terminal unit;
    identifying which function is provided by the application interface module;
    transmitting management information from the ADSL terminal unit to a subscriber management system and server specific to the application interface module in communications with the ADSL terminal unit;
    providing applications services for the ADSL terminal unit by the subscriber management system and server in response to the management information.

67. The method of claim 66 further comprising the step of hot plugging a device into the ADSL terminal unit.

68. The method of claim 66 further comprising the step of the subscriber management system and server providing telephony functions to the ADSL terminal unit according to a telephone module which is inserted in the ADSL terminal unit as a device.

69. The method of claim 68 further comprising the step of establishing a virtual circuit in response to a management signal so that voice data is routed through an ATM switch in an ATM packet format according to the virtual circuit.

70. The method of claim 66 further comprising the step of performing diagnostics on the ADSL terminal unit according to a field diagnostic module that was inserted as a device into the ADSL terminal unit.

71. The method of claim 70 further comprising the step of transmitting commands to the field diagnostic module by a computer system through a serial interface for testing the ADSL terminal unit.

72. The method of claim 70 further comprising the step of displaying a test result that was performed on a display of the field diagnostic module.

73. The method of claim 66 further comprising the step of coupling a home network module to the ADSL terminal unit for handling consumer network data.

74. The method of claim 73, wherein the consumer network data has an IEEE 1394 format.

75. The method of claim 74 further comprising the steps of:
    converting the IEEE 1394 format data input through the home network module to packets;
    sending the packets to a headend controller;
    converting packets sent by the headend controller and received by the home network module into the IEEE 1394 format for output by the home network module.

76. The method of claim 75, wherein the packets are carried in ATM cells.

77. The method of claim 73 further comprising the step of providing an universal serial bus interface through the home network module.

78. The method of claim 77 further comprising the steps of:
    converting a universal serial bus format data input through the home network module to packets;
    sending the packets to a headend controller;
    converting packets sent by the headend controller and received by the home network module to the universal serial bus format for output by the home network module.

79. The method of claim 78, wherein the packets are carried in ATM cells.

80. The method of claim 66 further comprising the step of providing an asynchronous transfer mode interface through the interface module.

81. The method of claim 66 further comprising the steps of:
    accepting video data from the subscriber management system and server;
    converting the video data by a television module inserted in the ADSL terminal unit as the application interface module;
    outputting an RF television signal by the television module.

82. The method of claim 81 further comprising the steps of:
    accepting a plurality of user commands through an infrared remote controller circuit in the television module;
    transmitting management information to the subscriber management system and server in response to the plurality of user commands;
    servicing the user commands by the subscriber management system and server.

83. The method of claim 68 further comprising the step of downloading software through a telephone to the ADSL terminal unit for supporting a device.

84. The method of claim 66 further comprising the step of downloading software through a cable network to the device for supporting a function offered by a device.

85. An application interface module for adding functionality to an Asymmetric Digital Subscriber Line (ADSL) terminal unit, comprising:
    a connector for coupling the application interface module to the ADSL terminal unit;
    a bus coupled to the connector;
    memory coupled to the bus for storing instructions or data, wherein the memory contains identification information for identifying a particular function of the application interface module;

a processor coupled to the bus for transmitting management information from the application interface module to the ADSL terminal unit, wherein the ADSL terminal unit transmits a request for applications services from a headend controller in response to the management information.

86. The application interface module of claim 85 providing a home network function.

87. The application interface module of claim 85 providing a telephony function.

88. The application interface module of claim 85 providing a diagnostic function.

89. The application interface module of claim 85 providing an ADSL function.

* * * * *